United States Patent
Mohan

(10) Patent No.: US 12,079,113 B1
(45) Date of Patent: Sep. 3, 2024

(54) RESOURCE MANAGEMENT FOR SOFTWARE TESTS

(71) Applicant: Zoox, Inc., Foster City, CA (US)

(72) Inventor: Vaibhav Mohan, Dublin, CA (US)

(73) Assignee: Zoox, Inc., Foster City, CA (US)

( * ) Notice: Subject to any disclaimer, the term of this patent is extended or adjusted under 35 U.S.C. 154(b) by 93 days.

(21) Appl. No.: 17/246,337

(22) Filed: Apr. 30, 2021

(51) Int. Cl.
*G06F 11/36* (2006.01)
*G06F 5/06* (2006.01)
*G06F 9/48* (2006.01)
*G06N 20/00* (2019.01)

(52) U.S. Cl.
CPC ............ *G06F 11/3688* (2013.01); *G06F 5/06* (2013.01); *G06F 9/4881* (2013.01); *G06N 20/00* (2019.01)

(58) Field of Classification Search
CPC ...... G06F 11/3688; G06F 5/06; G06F 9/4881; G06N 20/00
USPC ......................................................... 714/38.1
See application file for complete search history.

(56) References Cited

U.S. PATENT DOCUMENTS

| | | | |
|---|---|---|---|
| 2007/0226686 A1* | 9/2007 | Beardslee | G06F 9/546 717/109 |
| 2021/0056119 A1* | 2/2021 | Majmudar | G06F 16/273 |
| 2021/0232944 A1* | 7/2021 | Stanley | G06Q 30/0603 |
| 2022/0334891 A1* | 10/2022 | Fontaine | G06F 9/54 |

OTHER PUBLICATIONS

Wikipedia "GPU cluster" page from date Feb. 13, 2018, retrieved from https://web.archive.org/web/20080213063442/http://en.wikipedia.org:80/wiki/GPU_cluster (Year: 2008).*
Wikipedia "GPU" page from date Nov. 20, 2004, retrieved from https://web.archive.org/web/20041120023202/https://en.wikipedia.org/wiki/Graphics_processing_unit (Year: 2004).*
Wikipedia "computer cluster" page from date 104/May 2004, retrieved from https://web.archive.org/web/20040405103542/https://en.wikipedia.org/wiki/Computer_cluster (Year: 2004).*
Wikipedia "massive parallel processing" page, retrieved from https://en.wikipedia.org/wiki/Massively_parallel (Year: 2023).*

* cited by examiner

*Primary Examiner* — Yair Leibovich
(74) *Attorney, Agent, or Firm* — Lee & Hayes, P.C.

(57) ABSTRACT

Techniques for determining workstation devices and resource parameters for software tests are discussed herein. The workstation devices may include graphic processing units (GPUs) on which portions of the software tests are performed. The workstation devices and GPUs in the workstation devices may be allocated and designated for building and testing software programs. A task to be performed on a GPU cluster of a plurality of GPU clusters may be determined. The task may be added to a scheduling queue associated with the plurality of GPU clusters. The task may be assigned to an individual GPU, based at least in part on a memory constraint associated with the task. The task may be performed with the individual GPU of the GPU cluster to determine a result. The result may be returned to a computing device.

20 Claims, 5 Drawing Sheets

RESOURCE MANAGEMENT FOR SOFTWARE TESTS

BACKGROUND

Resource requirements for software tests utilized for development of computer programs have increased as the computer programs are increasingly more complex and expansive. Accurate selection and utilization of components in computer systems may enable, for example, the computer systems to build and execute software test programs. However, resources in environments that include multiple types of components required for different types of software tests may be inefficiently utilized. Workstation devices with central processing units (CPUs) and/or graphic processing units (GPUs) may be inappropriately allocated for certain types of software tests requiring the GPUs. Such shortcomings may result in extensive delays and complications in running the software tests, decreased efficiency in building and testing the software test programs, and/or problems in execution of other programs requiring the same resources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
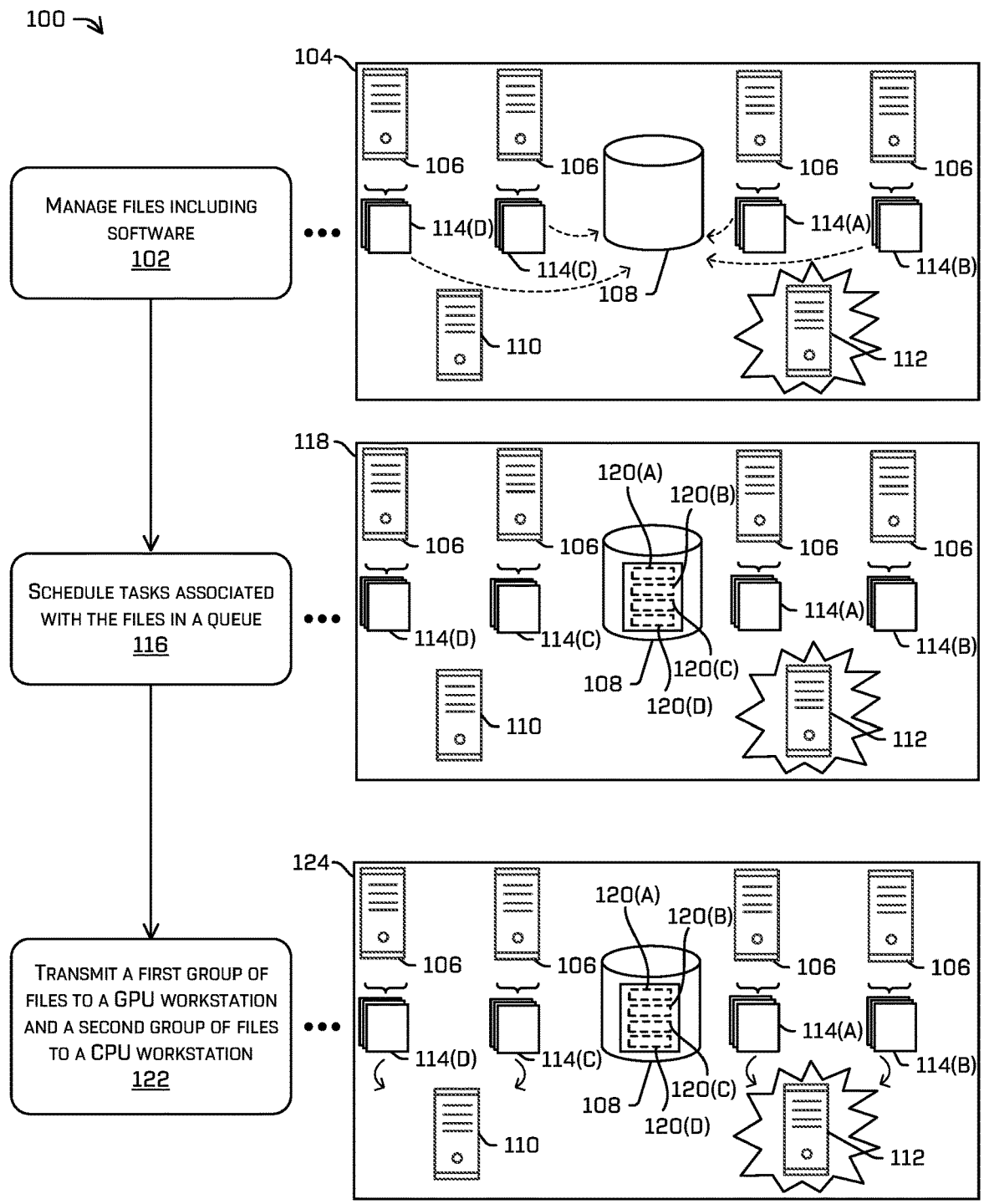
FIG. 1 is a pictorial flow diagram of an example process for resource management for software tests associated with graphics processing unit (GPU) workstation devices, in accordance with examples of the disclosure.

Techniques for determining workstation devices and resource parameters for software tests are discussed herein. Such workstation devices may include processing units on which portions of the software tests are performed. The processing units can include processing units (e.g., central processing units (CPUs)) configured primarily to perform complex serial operations, parallel processing units (e.g., graphic processing units (GPUs)) configured primarily to perform many relatively simple parallel operations concurrently, etc. Such workstation devices and GPUs in the workstation devices may be allocated and designated for building and testing software programs. The techniques may include determining a build graph associated with compiling, testing, or using software code. A task to be performed on a GPU cluster of a plurality of GPU clusters may be determined. The task may be determined based at least in part on the build graph. The task may be added to a scheduling queue associated with the plurality of GPU clusters. The task may be assigned to an individual GPU of the GPU cluster. The task may be assigned to the individual GPU based at least in part on a memory constraint associated with the task. The task may be performed with the individual GPU of the GPU cluster to determine a result. The result may be returned to a computing device.

The techniques discussed herein may comprise utilizing resources to perform tasks based on characteristics of the tasks. The characteristics may include the tasks being associated with different types of computing resources. The tasks may be associated with software code, which may be implemented as software tests associated with the computing resources. The computing resources may include workstation devices with GPUs, the GPUs of the workstation devices, and GPU memory slots. The tasks may be performed by utilizing the computing resources to compile or test software code associated with the tasks. The tasks associated with GPUs may be performed by utilizing the workstation devices with the GPUs, the GPUs. and the GPU slots. By scheduling performance of any of the tasks utilizing any slot in any GPU, and any GPU in any GPU workstation device, any number of tasks may be performed at any time. Any number of tasks may be performed at any time utilizing one or more slots in a GPU, one or more GPUs in a GPU workstation device, and one or more GPU workstation devices.

In some examples, the techniques may include determining scheduling queues associated with the tasks. The scheduling queues may be determined based on the tasks and the computer resources. The scheduling queues may input tasks based on the tasks being associated with the computing resources. The scheduling queues may perform the tasks based on the tasks being associated with programs that are executable to perform the jobs. The programs may be executed by the workstation devices. The programs executed to perform the jobs may obtain the jobs based on characteristics associated with the jobs and/or the computing resources. The programs may obtain the jobs further based on the jobs being associated with the different types of workstation devices.

In some examples, the techniques may comprise compiling, testing, or using the software code based on build graphs. The build graphs may be utilized to determine and schedule the tasks associated with the different resources. The resources may include components for performing the tasks. The components may perform the tasks by executing programs that retrieve files associated with the tasks managed by the scheduling queues. The build graphs may be associated with the scheduling queues being utilized to manage the tasks based on different modes. The modes of the scheduling queues may be utilized to determine the components for performing the tasks. The build graph may be determined based on test information associated with tasks that need to be performed, tasks currently being performed, and tasks that were previously performed. The test information may be utilized, along with information associated with the components, to determine the build graph. The test information may include characteristics associated with software code included in the files.

The techniques discussed herein can improve a functioning of a computing device in a number of additional ways. Specialized components required for performing tasks may be determined. The specialized components may include processors (e.g., CPUs) in clusters not utilizing parallel computing, processors (e.g., GPUs) in clusters utilizing parallel computing, firmware components, etc. Allocating the specialized components for performing the tasks may reduce inefficient utilization of computing resources, and may thereby reduce redundant compute cycles, heat expelled by processor(s), energy consumed, amount of time to achieve an output, etc. Furthermore, some tasks that may be performed by a portion of compatible components instead of all compatible components may become corrupted due to delays or errors. The delays and/or errors may cause corruption of the tasks due to performance of the tasks being reattempted without being the tasks re-initialized. The techniques discussed herein enable determining characteristics associated with tasks and components, scheduling the tasks for performance by the components based on the characteristics, and utilizing the components to execute programs and perform the tasks. Moreover, the techniques enable the ability to retrospectively modify a component utilized to perform a job, even when the job has already been run, to generate a new output. For example, a component may be added and/or replace another component and the program utilized to perform the job may be re-executed based at least in part on the added/replaced component.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configured to perform task(s) by executing program(s) utilizing file(s) with software code to compile, test, and/or use the software code. Additionally, the techniques described herein can be used with real data (e.g., captured using sensor(s)), simulated data (e.g., generated by a simulator), or any combination of the two.

Figure 2:
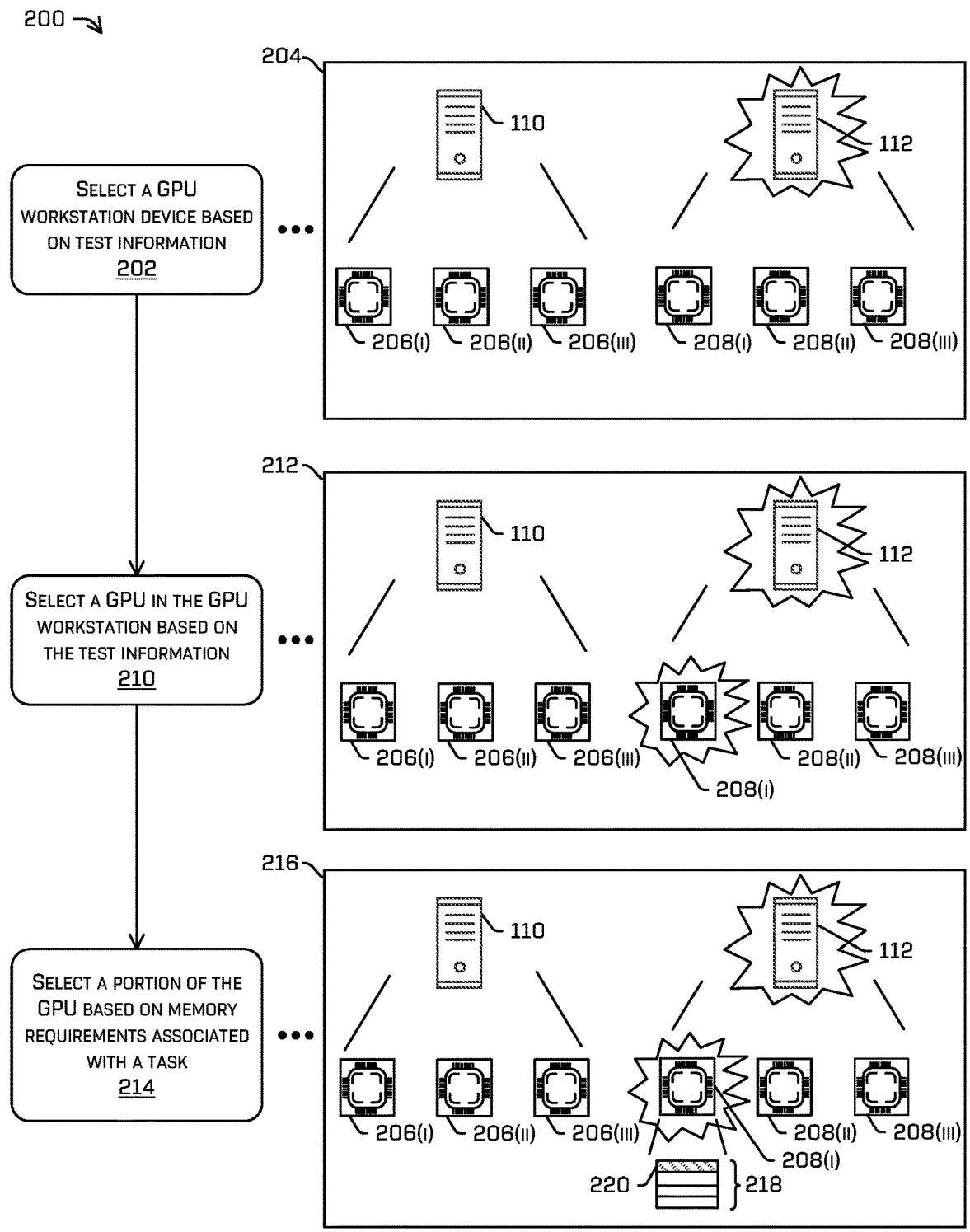
FIG. 2. is a pictorial flow diagram of an example process for resource management for software tests associated with GPUs, in accordance with examples of the disclosure.
Figure 3:
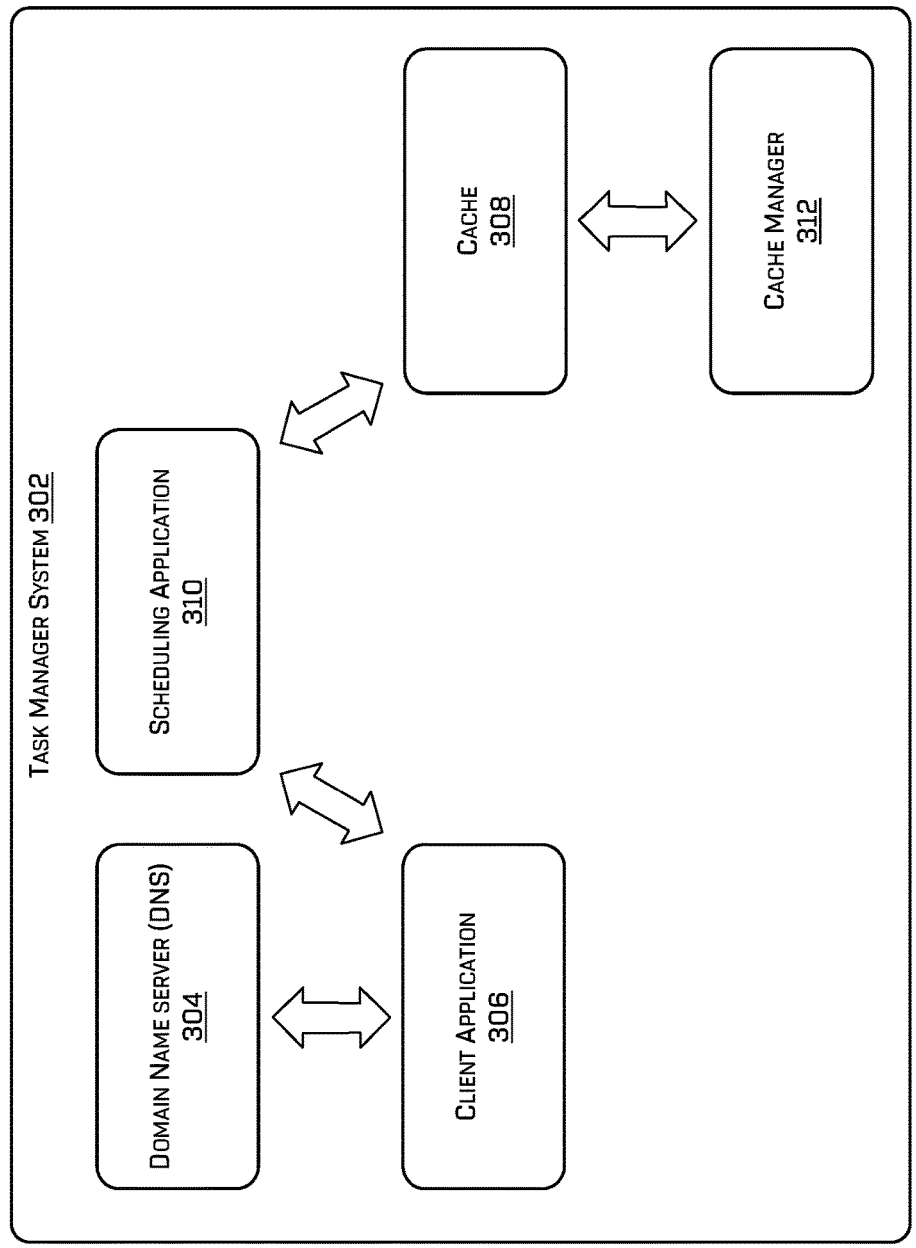
FIG. 3 depicts a block diagram of an environment for resource management for software tests associated with GPUs, in accordance with examples of the disclosure.

FIG. 1 is a pictorial flow diagram of an example process 100 for resource management for software tests associated with graphics processing unit (GPU) workstation devices, in accordance with examples of the disclosure. For example, the process 100 can be implemented using components and systems illustrated in FIGS. 2 and 3 and described below, although the process 100 is not limited to being performed by such components and systems. Moreover, the components and systems of FIGS. 2 and 3 are not limited to performing the process 100.

In more detail, the process 100 can include an operation 102 that includes managing files including software. The files may be determined and/or generated utilizing computing devices. The files may include software code. Portions of the software code may be associated with characteristics, which may include the portions of the software code being associated with devices (e.g., processing devices and/or workstation devices). The files may include one or more first files generated by one of the computing devices. The first file(s) may be associated with first software code. A portion of the first software code may be associated with a first characteristic. The first characteristic may include the portion of the first software code being associated with first instructions (e.g., GPU oriented instructions). In some examples, the first characteristic may include one or more GPUs being associated with execution by a program utilizing the first software code. In those examples, the first characteristic may include a requirement of the GPUs for the program to be executed utilizing the first file(s) (e.g., the first software code).

Different types of files may be associated with different computer processor requirements. The files may include one or more second files generated by one of the computing devices. The second file(s) may be associated with second software code. A portion of the second software code may be associated with a second characteristic. The second characteristic may include the portion of the second software code being associated with second instructions (e.g., CPU oriented instructions). The second characteristic may include a GPU not being required for execution by a program utilizing the second software code. In some examples, the second characteristic may include GPU(s) not being associated with execution by a program utilizing the second software code. In those examples, the second characteristic may include no requirement of the GPUs for the program to be executed utilizing the second file(s) (e.g., the second software code).

The files may be determined and managed utilizing scheduling queues. The scheduling queues may be utilized to determine and manage the files based on statuses (e.g., availabilities, locations, etc.) of the files. The scheduling queues may be utilized to manage the files based on the characteristics associated with the software code (e.g., the portions of the software code).

The files may be available to be utilized by, and/or transmitted to, workstation devices. The workstation devices may include a first workstation device with a GPU. In some instances, the first workstation device may include one or more GPUs. The first workstation device with the GPU(s) may execute a first program executed utilizing the first software code based on the first characteristic. The workstation devices may include a second workstation device with a CPU. In some instances, the first workstation device may include one or more CPUs. The second workstation device may include no GPUs. The second workstation device without any GPUs may execute a second program executed utilizing the second software code based on the second characteristic.

An example 104 illustrates an environment including computing devices 106, a scheduling queue 108, a workstation device 110, and a workstation device 112. The computing devices 106 may be associated with files 114. The files 114 may be associated with the computing devices 106 based on each of the files 114 being determined and/or generated by one of the computing devices 106. Any of the files 114 may be received, from one or more other computing devices, and determined by the one of the computing devices 106 as being received.

The files may be managed based on characteristics associated with processing devices. Each of the files 114 may include software code. Portions of the software code associated with the files 114 may be associated with characteristics. The characteristics may include the portions of the software code being associated with devices (e.g., processing devices and/or workstation devices).

Some files may be managed based on a requirement for a particular type of a processing device. The files 114 may include first files (e.g., the files 114(A) and 114(B)) and second files (e.g., the files 114(C) and 114(D)). The files 114(A) and 114(B) may be associated with software (e.g., first software code), which may be associated with first characteristics. Any of the files (e.g., the files 114(A) and 114(B)) associated with the first characteristics may implemented as discussed throughout this disclosure in a similar way as for the others. In some examples, the files 114(A) may be associated with the computing devices 106. A portion of the first software code of one or more the files 114(A) may be associated with a first characteristic (e.g., a GPU oriented characteristic). The first characteristic may include the portion of the first software code of the file(s) 114(A) being associated with first instructions (e.g., GPU oriented instructions). The first instructions may be a first type of instructions associated with the first instructions being compatible with a processing device (e.g., a GPU) of a first type. In some examples, the first characteristic may be associated with the first instructions utilizing and/or requiring the first type of processing device. The first instructions may utilize and/or require the first type of processing device for execution by the first program. In other examples, the first characteristic may be associated with the first program being optimized by utilizing the first type of processing device. The first program may be optimized by utilizing the first type of processing device for execution associated with the first instructions.

Some files may be managed based on a lack of a requirement for a particular type of processing device. The files 114(C) and 114(D) may be associated with software (e.g., software code), which may be associated with second characteristics. Any of the files (e.g., the files 114(C) and 114(D)) associated with the second characteristics may implemented as discussed throughout this disclosure in a similar way as for the others. In some examples, the files 114(C) and 114(D) may be associated with the computing devices 106. A portion of second software code of one or more of the files 114(B) may be associated with a second characteristic (e.g., a CPU oriented characteristic). The second first characteristic may include the portion of the second software code of the file(s) 114(B) being associated with second instructions (e.g., CPU oriented instructions). The second instructions may be a second type of instructions associated with the second instructions being associated with a processing device (e.g., a CPU) of a second type. In some examples, the second characteristic may be associated with the second instructions utilizing and/or requiring the second type of processing device. In those examples, the second characteristic may be associated with the second instructions not being associated with (e.g., not requiring, not utilizing, etc.) the first type of processing device (e.g., the GPU).

The files may be available for scheduling, and then available for utilization by workstation devices based on the scheduling. The files 114 may include the file(s) 114(A) associated with the first characteristic, which includes the first software code utilizing and/or requiring the GPU. The file(s) 114(A) may be made available to the scheduling queue 108. The files 114 may include the file(s) 114(B) associated with the second characteristic, which includes the second software code not utilizing, nor requiring, the GPU. The file(s) 114(B) may be made available to the scheduling queue 108.

Figure 4:
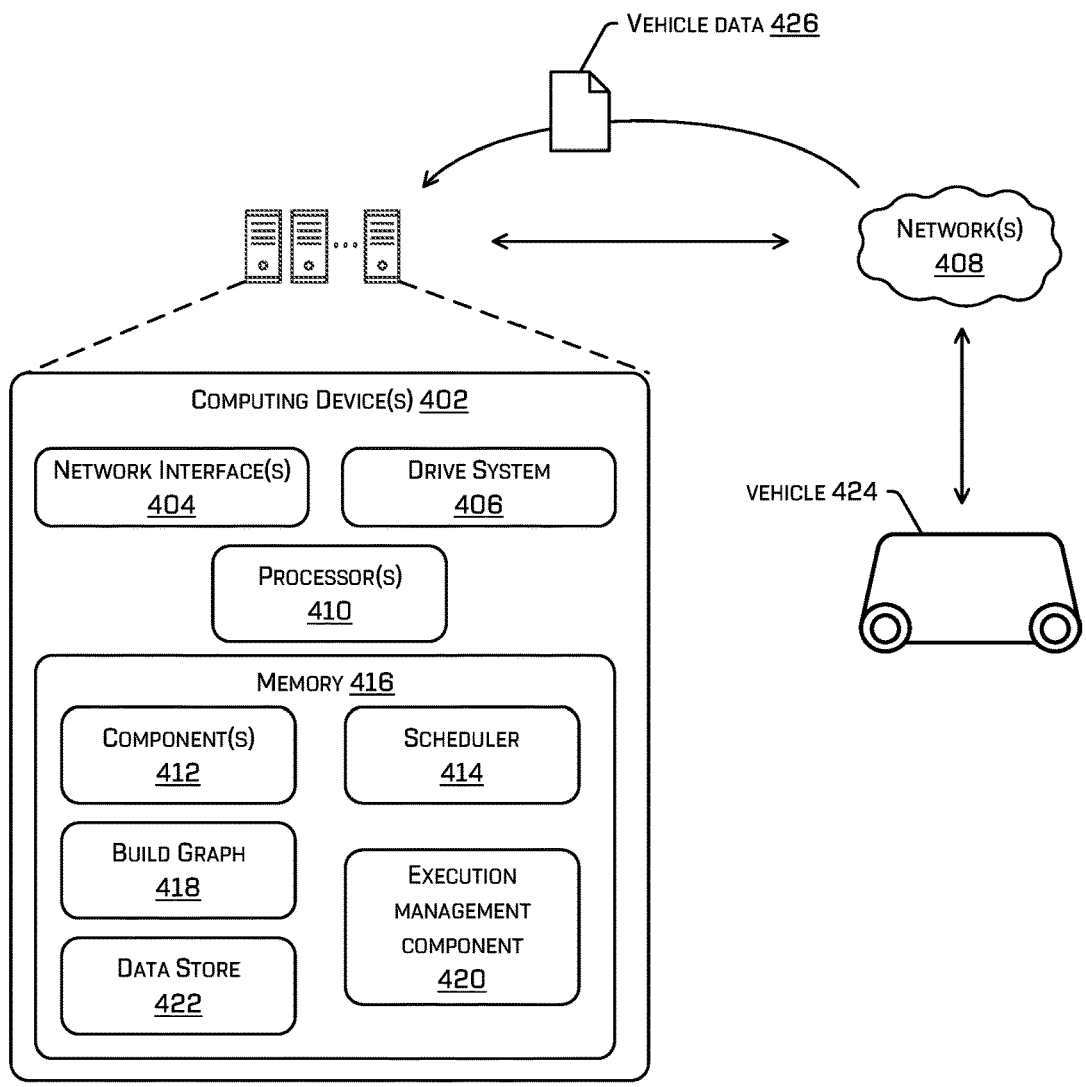
FIG. 4 illustrates a block diagram of an example architecture that implements the resource management techniques discussed herein.

The files may be available for scheduling based on test information associated with the files. In some examples, one or more files 114 (e.g., the file(s) 114(A) and/or the file(s) 114(B)) may be made available to the scheduling queue 108 based on test information (e.g., information in a request, a command, an indication, etc.) associated with the file(s) 114. The file(s) 114 may be made available based on the test information being determined, generated, and/or provided by a computing device (e.g., any one of the computing devices 106). However, the test information can be determined and/or managed by any device (e.g., the computing device 106, the device managing the scheduling queue 108, the workstation device 112, discussed above in FIG. 1, an external device, etc.). Managing of the test information may include generating, transmitting, receiving, updating, modifying, or any other functions discussed herein. The external device may include, but is not limited to, a device that is located outside the environment, or a device that is part of a different network (e.g., a network that is different from the network 408, as illustrated in FIG. 4 and discussed below).

Different types of test information associated with the files may be utilized by the queue. The file(s) 114 may be made available for scheduling based on different types of test information associated with the file(s) 114. Test information associated with the file(s) 114 may be utilized by the scheduling queue 108 for scheduling operations associated with the file(s) 114. The test information may include an indication (e.g., a tag or a flag). Tags, which may be associated with the file(s) 114 may be managed by any of the computing devices 106 or other devices (e.g., other local devices, external devices, etc.). The tags being managed may include the tags being, any of, generated, stored, modified, etc. The tags may include default tags, GPU tags, and CPU tags. The file(s) 114 may be associated with the default tags. Any of the default tags associated with the file(s) 114 may be modified to the GPU tag or the CPU tag, based on the characteristics associated with the file(s) 114. In some examples, the default tag associated with the file(s) 114(A) may be modified to be a GPU tag associated with the file(s) 114(A). The GPU tag may be associated with the file file(s) (A) based on the file(s) 114(A) being associated with the first characteristic (e.g., a GPU oriented characteristic). In some examples, the default tag associated with the file(s) 114(C) may be modified to be a CPU tag associated with the file(s) 114(C). The CPU tag may be associated with the file(s) 114(C) based on the file(s) 114(C) being associated with the second characteristic (e.g., the CPU oriented characteristic).

In addition to or in the alternative to tags, other types of test information associated with the files may be utilized for scheduling. In some examples, the test information may be transmitted in a request generated by the computing device 106. In some instances, the request may be generated based on input received by the computing device 106 and from a user. In some instances, the request may be generated by a program based on an amount of time meeting or exceeding a threshold amount of time. The amount of time may be an amount of time between a time at which previous test information was generated and a current time. The program may be executed on the computing device 106 or any other device (e.g., another one of the computing devices 106, any other local device, an external device, etc.). The request may be transmitted by the computing device 106 and to the scheduling queue 108 (e.g., another computing device operating the scheduling queue 108, and/or being utilized to manage/execute the scheduling queue 108). The request may include the file(s) 114 or not include the file(s) 114. In some examples, the test information may be transmitted in a command that is implemented similarly as for the request. The command may be associated with, and/or compliant to, a command protocol associated with the scheduling queue 108. The command may be associated with, and/or may identify, the file(s) 114. The command may be transmitted separately from, or without, the file(s) 114.

At operation 116, the process 100 may include scheduling tasks associated with the files in a queue. The queue may schedule the tasks based on the files. The tasks may include a first task of a first type associated with each of the first file(s). The first task may be associated with the first software code and the first characteristic. In some examples, the first task (e.g., a GPU oriented task or a CPU oriented task) may be associated with a processor requirement (e.g., a GPU requirement or a CPU requirement) for executing the program utilizing the first file(s) (e.g., the first software code). The processor requirement may include the first task being associated with software, which in turn is associated with a GPU or CPU. The software being associated with the GPU or the CPU may include the software being more efficiently compiled and/or executed on one or the other.

The tasks may be associated with software tests of different types. Any of the tasks may be associated with a software test for a GPU computing library, the GPU computing library being utilized for memory allocation on an individual GPU of a GPU workstation device to transmit data to a memory of the individual GPU. Any of the tasks may be associated with a software test (e.g., a GPU test) for a machine learned (ML) model. The ML model may output a result of the GPU test based on training that requires any GPU of a GPU workstation device.

Different tasks may be associated with different computer processor requirements. The tasks may include a second task of a second type associated with each of the second file(s). The second task may be associated with the second software code and the second characteristic. In some examples, the second task (e.g., a CPU oriented task) may be associated with a lack (e.g., an omission) of a GPU requirement for executing the program utilizing the second file(s) (e.g., the second software code).

An example 118 illustrates an environment including a scheduling queue 108. The scheduling queue 108 may perform scheduling of tasks 120. The scheduling queue 108 may schedule the tasks 120 based on the files 114. The tasks 120 may include tasks of a first type (e.g., tasks 120(A) and 120(B)). The task 120(A) may be associated with file(s) 114(A). The task 120(B) may be associated with file(s) 114(B). The tasks 120(A) and 120(B) may be associated with the first software code and the first characteristic. Any of the tasks (e.g., the tasks 120(A) and 120 (B)) associated with the first characteristics may implemented as discussed throughout this disclosure in a similar way as for the others. In some examples, the task 120(A) may be associated with a GPU requirement for executing the program utilizing the file(s) 114(A).

Different tasks may be associated with different computer processor requirements. The tasks 120 may include tasks of a second type (e.g., tasks 120(C) and 120(D)). The task 120(C) may be associated with file(s) 114(C). The task 120(D) may be associated with file(s) 114(D). The tasks 120(C) and 120(D) may be associated with the second software code and the second characteristic. Any of the tasks (e.g., the tasks 120(C) and 120 (D)) associated with the second characteristics may be implemented as discussed throughout this disclosure in a similar way as for the others. In some examples, the task 120(C) may be associated with no GPU requirement for executing the program utilizing the file(s) 114(C).

The tasks may be managed based on types of scheduling. The scheduling queue 108 may manage (e.g., schedule) the tasks 120 based on the different types of scheduling. The different types of scheduling utilized by the scheduling queue 108 may be associated with different modes of the scheduling queue 108. The scheduling queue 108 may have a mode (e.g., a first mode) associated with the tasks 120 being scheduled (e.g., assigned) based on a first-in, first-out (FIFO) order. An order (e.g., a first order) of the tasks 120 (e.g., the task 120(A), the task 120(B), the task 120(C), the task 120(D), etc.) in the scheduling queue 108 may be based on a time at which each of the tasks 120 is received. The first order may be determined based on the first mode (e.g., a FIFO mode).

The tasks may be scheduled based on prioritization. The scheduling queue 108 may have a second mode (e.g., a prioritization mode) associated with the scheduling queue 108 assigning tasks 120 based at least in part on a prioritization. An order (e.g., a second order) of the tasks 120 (e.g., the task 120(A), the task 120(B), the task 120(C), the task 120(D), etc.) in the scheduling queue 108 may be based on a priority of each of the tasks 120. An order (e.g., a second order) of the tasks 120 in the scheduling queue 108 may be determined based on the second mode.

The priorities may be determined based on test information (e.g., information including priority identifiers) associated with the files 114. The priority identifiers may be determined and/or generated by the computing devices 106. The priority identifiers may be received by the scheduling queue 108 and utilized to set levels of the priorities of the tasks 120. The priority identifier may include test information (e.g., information including a file identifier) associated with the file(s) 114(A). Additionally or alternatively, the priority identifier may be included in test information along with a computing device identifier associated with an origin device. The computing device identifier may be associated with the computing device 106 from which the files 114(A) are received. Additionally or alternatively, the priority identifiers may be included in test information along with information including a workstation device identifier associated with a destination device. The workstation device identifier may be associated with the workstation device (e.g., the workstation device 112) that will execute the program utilizing the file(s) 114(A).

In some examples, the test information associated with each of the tasks 120 (e.g., the task 120(A)) may be included in the files 114 (e.g., the file(s) 114(A)) associated with the task 120(A). In other examples, the test information may be included in metadata associated with, and received along with, the file(s) 114(A). In other examples, the test information may be included in messages separate from the file(s) 114(A). The test information transmitted by the computing devices 106 may be received by any other devices (e.g., the computing device managing the scheduling queue 108, any of the workstation devices (e.g., any of the workstation devices 110 and 112), etc.). The test information that is received by the scheduling queue may be utilized by the scheduling queue 108 to schedule the tasks 120. The scheduling queue 108 may utilize the test information to determine one or more of the workstation devices (e.g., one or more of the workstation devices 110 and 112) to which the file(s) 114 are to be transmitted. The scheduling queue 108 may determine the workstation device(s) (e.g., the workstation device(s) 110 and/or 112) based on the test information (e.g., the workstation device identifiers) associated with the file(s) 114.

The test information may include memory information. The test information may include a memory identifier associated with a memory constraint (e.g., an amount of memory). The memory identifier may be associated with one or more of the tasks 120 (e.g., the task 120(A)). The memory constraint (e.g., the amount of memory in the memory identifier) may include a minimum amount of memory required for performance of the task 120(A).

The test information may be updated for scheduling. The scheduling queue 108 may determine and/or generate test information (e.g., updated test information) based on the test information received from the computing device 106. The test information generated by the scheduling queue 108 may include the workstation device identifier. The workstation device identifier in the test information determined by the scheduling queue 108 may be determined based on the received test information (e.g., any of the identifiers, including the memory identifier, the priority identifier, etc.). The test information (e.g., the workstation device identifier) may be determined based on scheduling performance by the scheduling queue 108 in any mode, discussed above and below. In some examples, the test information transmitted by the scheduling queue 108 may be determined as the received test information that is updated by the scheduling queue 108. In other examples, the test information transmitted by the scheduling queue 108 may different from the received test information. The transmitted test information may include one or more portions (e.g., any of the priority identifier, the computing device identifier, the workstation device identifier, the memory identifier, etc.) of the received test information.

The priorities may be utilized to schedule tasks associated with the files. One or more of the files 114 may be associated with a priority. The priorities associated with the file(s) may be utilized to set priorities associated with the task(s) 120. In some examples, any of the tasks 120 with a first priority may be scheduled earlier than another of the task 120 with a second priority. The task 120 with the first priority may be scheduled earlier than the task 120 with the second priority based on a level of the first priority meeting or exceeding a level of the second priority. The task 120 that has the first priority may be entered into (e.g., scheduled by) the scheduling queue 108 at a first position that is lower than at second position of the scheduling queue 108 at which the task 120 that has the second priority is entered. The first position may be associated with the task 120 that has the first priority being output from the scheduling queue 108 before the task 120 that has the second priority. In some examples, priorities may be determined agnostically with respect to whether or not the file(s) 114 are associated with the GPU requirement.

The priorities may result in lower priority tasks with smaller resource requirements being scheduled after higher priority tasks with larger resource requirements. In some examples, the level of the priority of one of the tasks (e.g., the task 120(A)) associated with the GPU requirement may be at or above the level of the priority of another one of the tasks (e.g., the task 120(B)) associated with the GPU requirement. The task 120(A) may have larger resource requirements than the task 120(B). The task 120(A) may be scheduled at or above the task 120(B). The scheduling of the task 120(A) at or above the task 120(B) may be performed by the scheduling queue 108, notwithstanding GPU available resources satisfying requirements of the task 120(B).

The second mode may include determining (e.g., marking/setting) one or both of a GPU workstation device (e.g., the GPU workstation device 112), and a GPU of the GPU workstation device, as unavailable. The GPU and/or the GPU workstation device may be marked as unavailable based on a task 120 (e.g., a task with a first priority). In some examples, although the task 120 with the first priority is lower in the scheduling queue 108, the task 120 with the second priority may still be performed notwithstanding the GPU and/or the GPU workstation device being determined as unavailable. In some examples, the task 120 with the second priority may be performed utilizing the GPU in the GPU workstation device. The task 120 with the second priority may be performed, based on an amount of available space of the GPU and/or the GPU workstation device meeting or exceeding an amount of space required for perming of the task 120 with the first priority. The task 120 with the second priority may be performed, further based on an amount of available space of the GPU and/or the GPU workstation device not meeting or exceeding an amount of space required for perming of the task 120 with the second priority. The task 120 may be assigned to the GPU and/or the GPU workstation device. The task 120 may be performed by the GPU in the GPU workstation device, based on the task 120 being assigned to the GPU. The task 120 may be performed any GPU in the GPU workstation device, based on the task 120 being assigned to the GPU workstation device.

The tasks may be scheduled based on changes in GPU available resources. The task 120(A) may be performed before the task 120(B) at a time associated with a change in the GPU available resources. The GPU available resources that change may include an increase in the GPU available resources. The GPU available resources may be changed based on a completion of a performance of each of one or more other tasks. The GPU available resources may be changed based on an increase of the GPU available resources. The increase of the GPU available resources may be based on GPU available resources (e.g., GPUs and/or amounts of memory in GPUs) being added to the workstation device 112. Alternatively or additionally, the increase of the GPU available resources may be based on a designation of a change of the GPU available resources. The designation of the increase of the GPU available resources may be based on test information (e.g., a resource indicator (e.g., a component indicator)) received by the scheduling queue 108. The designation may be received from the workstation device (e.g., the workstation device 112) being utilized to perform the task 120. The designation may be received from the workstation device based on input to the workstation device 112 from a user or another computing device. The designation may result in resources (e.g., GPUs and/or amounts of memory in GPUs) of the workstation device 112 being utilized (e.g., active), based on the GPUs being not previously utilized (e.g., dormant). The task 120(A) may be performed utilizing the GPU available resources that satisfy the requirements of the task 120(A) based on the increase in the GPU available resources (e.g., additional/new GPUs being added or utilized to replace nonoperational GPUs). The task 120(B) may be performed based on performance of the task 120(A) beginning. The task 120(B) may be performed based on performance of the task 120(A) being partially or fully completed.

The priorities may be determined based on types of computer processors. In some examples, the task 120 with the first priority may be one of the tasks (e.g., the task 120(A)) of the first type. In those examples, the task 120 with the second priority may be one of the tasks (e.g., the task 120(C)) of the second type. A level of the first priority of the task 120(A) may be set at or above a level of the second priority of the task 120(C). The level may be set based on whether the task 120 is associated with the GPU requirement. The task 120(A) may be have the level of the first priority set at or above the level of the second priority, based on the task 120(A) being associated with the GPU requirement. The level of the first priority may be set at or above the level of the second priority, further based on the task 120(C) not being associated with the GPU requirement.

In addition to or in the alternative, scheduling may be based on reorganization. The scheduling queue 108 may have a third mode (e.g., a reorganization mode) associated with the scheduling queue 108. The third mode may include the tasks 120 being scheduled based on GPU available resources (e.g., GPUs and/or amounts of memory of GPUs) associated with performance of the task 120. An order (e.g., a third order) of the tasks 120 in the scheduling queue 108 may be determined based on the third mode. In some examples, one of the tasks (e.g., the task 120(A)) may be performed by utilizing the workstation device 112. Performance of the task 120(A) may be transferred from the workstation device 112 and to another workstation device. Transferring of performance of the task 120(A) may include performance being transferred from a GPU in the workstation device 112 to a GPU in the other workstation device. Any of the modes may be utilized in any order for scheduling and/or rescheduling a single task, until completion of the task. Any of the modes may be utilized in any order for scheduling and/or rescheduling more than one task, until completion of the tasks. The performance being transferred may include transferring from one or more memory slots in each of one or more GPUs in a workstation device to one or more memory slots in each of one or more other GPUs in the same workstation device or in a different workstation device.

Reorganization may be based on memory required for performance of tasks and available memory of workstation devices. Transferring of performance of the task 120(A) may be based on the amount of memory associated with the task 120(A) exceeding a total amount of available memory of the workstation device 112. Additionally or alternatively, transferring of performance of the task 120(A) may be further based on an amount of memory associated with the task 120(A) not exceeding a total amount of available memory of the other workstation device. Transferring of performance of the task 120(A) may include rescheduling of the task 120(A) to be after one or more other of the tasks 120. The rescheduling may be performed by the scheduling queue 108. In some examples, rescheduling of the task 120(A) may include the task 120(A) being rescheduled to be performed after the task 120(B). The task 120(A) may be rescheduled due to an amount of memory associated with the task 120(B) not exceeding the total amount of available memory of the workstation device 112. In some instances, the total amount of available memory of the workstation device 112 may include a total amount of available memory of a single GPU (e.g., a GPU with a largest amount of available memory with respect to the remaining GPUs) of the workstation device 112, or of a memory slot of the single GPU. In other instances, the total amount of available memory of the workstation device 112 may include a total amount of available memory of all GPUs of the workstation device 112.

Although the workstation device may be utilized for any of the modes discussed above in this disclosure, it is not limited as such. Any specialized component(s) (e.g., GPU device(s), firmware component(s), etc.), or any portion of the specialized component(s) (e.g., (e.g., any slot of any of the GPU device(s), any of the firmware component(s), etc.), may be determined and utilized in a similar way as for the specialized workstation device based on any of the modes. In some examples, one or more GPUs and/or one or more portions of any of the GPUs may be utilized to perform the tasks, based on the task being scheduled during the FIFO mode. In some examples, the priority identifier for the priority mode may be associated with one or more GPUs and/or with one or more portions of any of the GPUs. In some examples, transferring of performance of the task 120(A) may be based on the amount of memory associated with the task 120(A) exceeding a total amount of available memory of one or more GPUs and/or one or more portions of any of the GPUs. The performance of the task 120(A) based on the reorganization mode may be transferred from any of one or more GPUs and/or any of one or more portions of any of the GPUs, to any other of one or more GPUs and/or any other of one or more portions of any of the GPUs. Although modes being utilized separately for the scheduling queue are discussed throughout this disclosure, it is not limited as such. The scheduling queue may utilize any of the modes for one or more tasks of any type at the same time as any other mode for one or more other tasks of any type. Any scheduling queue may utilize any of the modes at the same time as any other scheduling queue utilizing any other mode.

Transferring performance of the task 120(A) (e.g., transferring performance during the reorganization mode) may include ceasing performance of the task 120(A). Performance of the task 120(A) may be ceased temporarily or permanently. Performance of the task 120(A) being ceased temporarily may be followed by performance of the task 120(A) starting over or resuming, based on a position of the task 120(A) changing to be before any other task 120. The position of the task 120(A) may be changed based on performing and/or completion of all other tasks 120 positioned in the scheduling queue 108 before the task 120(A).

At operation 122, the process 100 may include transmitting a first group of files to a GPU workstation and a second group of files to a CPU workstation. The first group of files and the second groups of files may be transmitted based on tasks in the queue. The first group of files may be transmitted based on the first task in the queue. The second group of files may be transmitted based on the second task in the queue. The queue may schedule the first task and the second task to determine that the first group of files will be transmitted before or after the second group of files.

Files may be transmitted to workstation devices based on types of the files. The first group of files may include the first file(s) associated with requirement of the GPUs for a program to be executed utilizing the first file(s). In some examples, the first file(s) may be transmitted to a GPU workstation device. The GPU workstation device may be selected as a destination device (e.g., a recipient device), based on the GPU requirement. The GPU requirement may include the first file(s) requiring one or more GPUs for execution of a program utilizing the first file(s). The program may be utilized to build software code (e.g., the first software code) associated with the first file(s). The program executed by the GPU workstation device may be a complier utilized to process the software code associated with the first file(s). In some instances, the first file(s) may be software code (e.g., first software code) being transmitted to be built. The software code associated with the first file(s) may be built as performance of the task associated with the first file(s). The software code may be built based on determining the build graph associated with compiling the software code. A result of the software code being built (e.g., one or more files (e.g., one or more executable files)) may be returned by the first workstation device to a computing device (e.g., the computing device associated with the first file(s) utilized to determine the first task, another one of the computing devices (e.g., one of the computing devices 106), any other local device, an external device, etc.).

The files of different types may be transmitted to different types of workstation devices. The second group of files may include the second file(s) associated with no requirement of the GPUs for a program to be executed utilizing the second file(s). In some examples, the second file(s) may be transmitted to a CPU workstation device. The CPU workstation device may be selected as a destination device (e.g., recipient device), based on no GPU requirement for execution of a program utilizing the second file(s). The program may be executed utilizing the second file(s) based on the second file(s) not requiring the GPU(s) for execution of the program. The program executed by the CPU workstation device may be a complier utilized to process the software code associated with the second file(s). The program may be utilized to build software code (e.g., second software code) associated with the second file(s). In some instances, the second file(s) may be software code (e.g., second software code). The second file(s) may be transmitted for the software code to be built. The software code associated with the second file(s) may be built as performance of the task associated with the second file(s). The software code may be built based on determining the build graph associated with compiling the software code. A result of the software code being built (e.g., one or more files (e.g., one or more executable files)) may be returned by the second workstation device to a computing device (e.g., the computing device associated with the second file(s) utilized to determine the second task, another one of the computing devices (e.g., one of the computing devices 106), any other local device, an external device, etc.).

Therefore, and as described herein, tasks (e.g., the tasks 120) may be scheduled to be performed in parallel. Any of the tasks 120 may be performed utilizing one or more of the specialized workstation devices (e.g., the workstation device 112 including one or more GPUS, a workstation device including one or more firmware components, etc.). Any of the task(s) 120 may be a specialized task (e.g., a task associated with a requirement of specialized component (e.g., a GPU, a firmware component, etc.)). Any of the task(s) 120 may be performed on one or more of the specialized workstation device(s) that satisfy the requirement of the task 120.

Furthermore, by utilizing a queue (e.g., the scheduling queue 108) to schedule each of the tasks 120, deficiencies of the conventional technology limited to utilizing one workstation device for performing one job (e.g., a single job associated with a specialized task) at a time may be overcome. Specialized tasks may be performed in parallel. The same specialized workstation device(s) may be utilized to perform any of the specialized task(s), along with any of one or more other specialized tasks with a same requirement (e.g., a requirement for a GPU, a requirement for a firmware component, etc.). The tasks being performed in parallel by specialized components enable more efficient processing of complex jobs (e.g., rendering of images to created three-dimensional representations of environments through which vehicles travel).

By scheduling the tasks 120 based on the requirements of the tasks 120, a specialized workstation device (e.g., a GPU workstation device) may be attached to a build system, notwithstanding the build system being configured for CPU building tasks. The workstation device 112 may be utilized for the tasks 120 with the GPU requirement, to efficiently process the tasks 120 utilizing resources of the workstation device 112. The workstation device resources may include memory for storing software associated with tasks 120 to be compiled via processors of the workstation device 112 in parallel. The build system configured for CPU building tasks may be modified to include a data tag indicating that a task (e.g., a build task) 120 is to be performed by the workstation device 112. Any of the build tasks 120 flagged by a data tag may be scheduled to be the workstation device 112 Any resources (e.g., any portion of any of one or more GPUs) of the workstation device 112 that are not fully utilized by any of the tasks 120 may be utilized at the same time as, or with a period of time overlapping, utilization of the resources by one or more subsequent tasks 120. Utilization of remaining resources of the workstation device 112 may be based on any of the subsequent tags 120 being flagged as compilable by the remaining resources. One or more files 114 associated with any of the subsequent tasks 120 flagged by a data tag may be routed to the workstation device 112.

Although task(s) performed by utilizing the scheduling queue, and job(s) performed by executing programs based on scheduling of the task(s), are discussed throughout this disclosure, it is not limited as such. The term "task" discussed in the context of performance based on scheduling by the scheduling queue, and the term "job" discussed in the context of execution of the program utilizing the file(s) associated with the "task," are for convenience of explanation. As such, any discussion throughout this disclosure that is associated with performance of the "task" may be interpreted in a similar way as for performance of the "job." and vice versa.

An example 124 illustrates an environment including the files 114 being transferred to the workstation device 110 or the workstation device 112. The first group of files may include the first file(s) (e.g., the file(s) 114(A)). The second group of files may include the second file(s) (e.g., the file(s) 114(C)).

Scheduling of files may be based on modes of scheduling. The file(s) 114(A) and the file(s) 114(B) may be transmitted based on tasks 120 in the scheduling queue 108. The file(s) 114(A) may be transmitted based on the task 120(A) in the scheduling queue 108. The file(s) 114(B) may be transmitted based on the task 120(B) in the scheduling queue 108. The scheduling queue 108 may schedule the task 120(A) and the task 120(B) to determine that the file(s) 114(A) will be transmitted before or after the file(s) 114(B). Performing of the task 120(A) before the task 120(B) may be determined by the scheduling queue 108 in the FIFO mode, based on the task 120(A) being received prior to the task 120(B). Performing of the task 120(A) before the task 120(B) may be determined by the scheduling queue 108 in the prioritization mode, based on the level of the priority of the task 120(A) being at or above the level of the priority of the task 120(B). In some examples, the priority of the task 120(A) may be determined based on an amount of time spent by the task 120(A) in the scheduling queue 108, and an amount of time spent by the task 120(B) in the scheduling queue 108. The amount of time spent by the task 120(A) in the scheduling queue 108 may be determined to meet or exceed amount of time spent by the task 120(B) in the scheduling queue 108. The priority of the task 120(A) may be set higher based on the amount of time spent by the task 120(A) meeting or exceeding the amount of time spent by the task 120(B).

Scheduling of files may be based on the reorganization mode. Transmission (e.g., performance) of the task 120(A) before the task 120(B) may be determined by the scheduling queue 108 in the reorganization mode. Transmission of the task 120(A) may be determined by the scheduling queue 108 in the reorganization mode, based on the amount of memory required to perform the task 120(A) and the amount of memory required to perform the task 120(B). In some examples, performing of the task 120(A) may be determined based on the amount of memory required to perform the task 120(B) being at or above an amount of GPU available memory of the workstation device 112. Performing of the task 120(A) may be determined, further based on the amount of memory required to perform the task 120(A) being less than amount of GPU available memory of the workstation device 112. In some examples, reorganizing the task 120(B) to be performed before the task 120(A) may be determined in the reorganization mode, based on a change in the amount of GPU available memory of the workstation device 112. The change in the amount of GPU available memory may include the amount of GPU available memory becoming larger. The amount of GPU available memory of the workstation device 112 prior to the change may not meet or exceed the amount of memory required to perform the task 120(B). The amount of GPU available memory of the workstation device 112 after the change may meet or exceed the amount of memory required to perform the task 120(B). Reorganization may include rescheduling by the scheduling queue 108 to change positions of the tasks 120(A) and 120(B), by setting the task 120(B) before the task 120(A).

Scheduling of files may be based on types of files. The file(s) 114(A) and the file(s) 114(C) may be transmitted based on tasks 120 in the scheduling queue 108. The file(s) 114(C) may be transmitted based on the task 120(C) in the scheduling queue 108. The scheduling queue 108 may schedule the task 120(A) and the task 120(C) to determine that the file(s) 114(A) will be transmitted before or after the file(s) 114(C). Scheduling of any of the first file(s) the files 114(A) and any of the second file(s) (e.g., the files 114(C)) based on the modes of the scheduling queue 108 may be similar as discussed above for scheduling of more than one of the first file(s) (e.g., the files 114(A) and the files 114(B)).

Files may be transmitted to workstation devices based on types of the files. The files 114 include the first group of files being transmitted to the workstation device 112. In some examples, the file(s) 114(A) may be transmitted to a GPU workstation device (e.g., a workstation device 112), being determined as a specialized workstation device. The workstation device 112 may be selected as a destination device (e.g., a recipient device), based on a GPU requirement being associated with the file(s) 114(A). The GPU requirement may include the file(s) 114(A) requiring one or more GPUs for execution of a program utilizing the file(s) 114(A). The program may be utilized to build software code (e.g., first software code) associated with the file(s) 114(A). In some instances, the file(s) 114(A) may be software code (e.g., first software code) being transmitted to be built. The software code associated with the file(s) 114(A) may be built as performance of the task associated with the file(s) 114(A). The software code may be built based on determining the build graph associated with compiling the software code. A result of the software code being built may be returned by the workstation device 112 to a computing device (e.g., the computing device 106 associated with the file(s) (e.g., the file(s) 114(A) utilized to determine the task (e.g., the task 120(A)), another one of the computing devices (e.g., any of the computing devices 106), any other local device, an external device, etc.).

The files of different types may be transmitted to different types of workstation devices. In some examples, the file(s) 114(C) may be transmitted to a CPU workstation device (e.g., the workstation device 110). The workstation device 110 is selected as a destination device (e.g., recipient device), based on no GPU requirement being associated with the file(s) 114(C). A program may be executed utilizing the file(s) 114(C) based on the file(s) 114(C) not requiring the GPU(s) for execution of the program. The program may be utilized to build software code (e.g., second software code) associated with the file(s) 114(C). In some instances, the file(s) 114(C) may be software code (e.g., second software code). The file(s) 114(C) may be transmitted for the software code to be built. The software code associated with the file(s) 114(C) may be built as performance of the task associated with the file(s) 114(C). The software code may be built based on determining the build graph associated with compiling the software code. A result of the software code being built may be returned by the workstation device 110 to a computing device (e.g., the computing device 106 associated with the file(s) (e.g., the file(s) 114(C) utilized to determine the task (e.g., the task 120(C)), another one of the computing devices (e.g., any of the computing devices 106), any other local device, an external device, etc.).

Although the scheduling queue implemented with various features is discussed in this disclosure, it is not limited as such. The term "scheduling queue" may be interpreted as being "device associated with the scheduling queue" throughout this disclosure. The device associated with the scheduling queue may be any device (e.g., one or more of the computing device, another computing device, an external computing device, a workstation device, etc.) utilized to manage the scheduling queue. A partial or complete portion of the scheduling queue, and/or any functions of the scheduling queue discussed herein, may be implemented by any of the devices. Although device(s) that provide files, provide requests for adding tasks to the queue, and/or receive results based on jobs being performed are discussed in this disclosure, it is not limited as such. Any device (e.g., any of the computing devices 106, any other local device, any external device, etc.) (also referred to herein as a "client device") may be utilized to perform those functions.

FIG. 2. is a pictorial flow diagram of an example process for resource management for software tests associated with graphics processing units (GPUs), in accordance with examples of the disclosure. For example, the process 200 can be implemented using components and systems illustrated in FIG. 3 and described below; although the process 200 is not limited to being performed by such components and systems.

In more detail, the process 200 can include an operation 202 that includes selecting a GPU workstation device based on test information. The test information (e.g., information in a request, a command, an indication, etc.) may be associated with a computing device. The test information associated with the computing device may be determined, generated, and/or provided by the computing device.

An example 204 illustrates an environment including one or more computer processing unit (CPU) workstation devices (e.g., the workstation device 110 discussed above in FIG. 1) and one or more GPU workstation devices (e.g., the workstation device 112 discussed above in FIG. 1). Each of one or more CPU workstation devices may be associated with a CPU cluster among a plurality of CPU clusters. The workstation device 110 may include one or more CPUs 206 (e.g., a CPU 206(*i*), a CPU 206(*ii*), and a CPU 206(*iii*)), but not include any GPUs. The CPUs 206 may be implemented as a cluster of CPUs associated with the workstation device 110. The CPU workstation device 110 may include any number (e.g., 1, 2, 4, 8, etc.) of CPUs 206. Each of the one or more GPU workstation devices may be associated with a parallel computing cluster (e.g., a GPU cluster) among a plurality of GPU clusters. The workstation device 112 may implemented similarly as for the workstation device 110, and with one or more GPUs 208 (e.g., a GPU 208(*i*), a GPU 208 (*ii*), and a GPU 208 (*iii*)). The GPUs 208 may be implemented as a cluster of GPUs 208 associated with the workstation device 112. The GPU workstation device 112 may include any number (e.g., 1, 2, 4, 8, etc.) of GPUs 208.

One or more of the GPU workstation devices (e.g., the workstation device 112) may be selected based on test information. Selection of the workstation device 112 may include selection of the cluster of GPUs 208 associated with the workstation device 112. Selection of the workstation device(s) may be performed by the scheduling queue 108 discussed above in FIG. 1. The test information (e.g., information in a request, a command, an indication, etc., discussed above in FIG. 1) may be associated with a computing device (e.g., any of the computing devices 106 discussed above in FIG. 1). The workstation device 112 may receive files (e.g., one or more files 114) to be utilized during execution of a program by the workstation device 112. The workstation device 112 may receive the file(s) 114 based on a selection of the workstation device 112. The workstation device 112 may be selected based on the test information (e.g., a workstation device identifier).

At operation 210, the process 100 may include selecting a GPU in the GPU workstation based on the test information. The GPU may be selected based on the test information. Selection of the GPU may include assigning the task to the GPU. In some examples, more than one GPU may be selected and utilized, instead of the single GPU, to perform a single task.

An example 212 illustrates an environment including the workstation device 112 with one or more GPUs (e.g., the GPU 208(i)) that may be selected. Selection of the GPUs may be performed by the scheduling queue 108. The GPU 208(i) may be selected based on the test information. The test information may further include a processing device identifier. The test information (e.g., any of the identifiers including the workstation device identifier, the processing device identifier, etc.) may be utilized to select the GPU 208(i) for performing any of the GPU oriented tasks (e.g., any of the tasks 120(A) and 120(B)) discussed above in FIG. 1. Selection of the GPU 208(i) may include assigning the task 120(A) to the GPU 208(i). The task 120(A) may be executed on the GPU 208(i), based on the task 120(A) being assigned to the GPU 208(i).

In some examples, a GPU test (e.g., a test associated with the task 120(A)) may be executable by a first GPU (e.g., the GPU 208(i)) of the workstation device 112 based at least in part on a number of tests being executed by the GPU 208(i) not meeting or exceeding a threshold number of tests. In some examples, a second GPU test (e.g., a test associated with the task 120(B)) may be executable by a second GPU (e.g., the GPU 208(ii)) of the workstation device 112, based at least in part on a memory size required for executing the second GPU test not exceeding a total size of available memory of the GPU 208(ii) for executing GPU tests.

In some examples, available memory (e.g., a total size of available memory) associated with any of the CPU workstation devices (e.g., the workstation device 110) or any of the GPU workstation devices (e.g., the workstation device 112) may be published to the scheduling queue 108. The workstation device 110 may publish availability (e.g., the total size of available memory for any or all of the CPUs) associated with the workstation device 110 to a scheduling algorithm (e.g., a scheduling algorithm utilized by the scheduling queue 108). The workstation device 112 may publish availability (e.g., the total size of available memory for any or all of the GPUs) associated with the workstation device 112 to the scheduling algorithm.

In some examples, the task 120(A) may be assigned, as a first task, to the first GPU (e.g., the GPU 208(i)) based at least in part on load balancing. The GPU 208(i) may be selected based at least in part on a first job load (e.g., a first total number of jobs, an execution time associated with job(s), a total memory allocated to the job(s), etc.) being executed by the GPU 208(i) and a second job load (e.g., a second total number of jobs, an execution time associated with job(s), a total memory allocated to the job(s), etc.) being executed by the second GPU (e.g., the GPU 208(ii)), the first job load being greater than the second job load.

In some examples, a task (e.g., the task 120(B)) may be assigned based on preemption. The task 120(B) may be assigned to a third GPU (e.g., the GPU 208(iii)) based at least in part on a first total size of available memory in the GPU 208(iii) and a second total size of available memory in a fourth GPU (e.g., a GPU 208(iv), not shown). The task 120(B) may be assigned based on the first total size of available memory in the GPU 208(iii) being greater than a second total size of available memory in the GPU 208(iv). The task 120(B) may be assigned notwithstanding a task 120(C) being before the task 120(B) in the scheduling queue 108. An amount of memory required for performance of the task 120(B) may be at or above an amount of memory required for performance of the task 120(C). Performance of the task 120(C) may be transferred to a different one of the GPUs 208 that is not being utilized. Alternatively or additionally, performance of the task 120(C) may be transferred to one or more slots on the different one of the GPUs 208. A total size of available memory in the different one of the GPUs 208 may be less than and the total size of available memory in the GPU 208(iii). In some examples, performance of the task 120(C) may be transferred to the GPU 208(iv). The GPU 208(iv) may be in the same workstation device as the GPU 208(iii) or a different GPU workstation device.

Although the total size of available memory utilized to schedule the tasks 120 is discussed in this disclosure, it is not limited as such. The total size of available memory may be utilized, additionally or alternatively, to total size of actual memory of any specialized component (e.g., a GPU, a CPU, a firmware component) for scheduling and/or performing of any of the tasks 120. The total size of actual memory may be utilized in a similar way as for the total size of available memory discussed herein.

At operation 214, the process 100 may include selecting a portion of the GPU based on memory requirements associated with a task. The portion of the GPU may include one or more slots (e.g., memory slots) of the GPU. The GPU may include any number (e.g., 1, 2, 4, 8, 16, 32, etc.) of slots. Each of the slots may be associated an amount of memory (e.g., gigabyte (GB), 3 GB, 6 GB, 12 GB, etc.) of the GPU. The memory may include random access memory (RAM). The portion may be selected based on test information. The test information may include test information determined by the workstation device and/or test information received from the queue. In some examples, the test information utilized to select the portion of the GPU may be the test information received from the queue. In other examples, test information determined by the workstation device may different from the test information received from the queue. The different test information may be determined based on the test information received from the queue. The different test information determined by the workstation device may include one or more portions (e.g., any of the priority identifier, the computing device identifier, the workstation device identifier, the memory identifier, etc.) of the test information received from the queue.

An example 216 illustrates an environment including the GPU 208(i) with portions (e.g., slots) 218 available to be utilized for performance of a task. One of the slots 218 (e.g., a slot 220) may be selected. The slot 220 may be selected based on the task information. The slot 220 may be utilized for performance of any of the GPU oriented tasks (e.g., any of the tasks 120(A) and 120(B)), based on the selection. Selection of the slot 220 may include assigning the task 120(A) to the slot 220. The task 120(A) may be executed on the slot 220, based on the task 120(A) being assigned to the slot 220. By scheduling performance of any of the tasks 120 utilizing any slot in any GPU in any GPU workstation device, any number of tasks 120 may be performed at any time. Any number of tasks 120 may be performed utilizing one or more slots in a GPU, one or more GPUs in a GPU workstation device, and one or more workstation devices.

Although specialized workstation station devices utilized to schedule the tasks associated with the requirement for the GPU are discussed in this disclosure, it is not limited as such. The specialized workstation station devices discussed throughout the disclosure may be implemented as specialized workstation station devices (e.g., workstation devices with specialized firmware components) utilized to schedule tasks associated with a requirement for firmware. By way of example, tasks may be scheduled and utilized to perform jobs with one or more specialized workstation devices that have one or more specialized components (e.g., firmware component(s)), in a similar way as for the tasks associated with GPUs being required for performance of jobs. The tasks may be scheduled based on associating the tasks with the specialized workstation device(s), and/or associating the task with one or more firmware components of each of the specialized workstation device(s). A queue (e.g., the scheduling queue 108 or a different queue) can be utilized to schedule the tasks associated with a requirement of specialized components (e.g., firmware component(s)) for performance of jobs.

Although the tasks associated with a GPU requirement assigned to the GPU oriented components (e.g., the GPU workstation devices, the GPUs, the slots in the GPUs, etc.) are discussed above in this disclosure, it is not limited as such. Tasks associated with no GPU requirement may be assigned to the CPU oriented components (e.g., the CPU workstation devices, the CPUs, the slots in the CPUs, etc.) in a similar way as for the task associated with the GPU requirement.

Therefore, and as described herein, tasks (e.g., the tasks 120) may be scheduled to be performed in parallel. Any of the tasks 120 may be performed utilizing one or more of the specialized components (e.g., one or more of the GPUs 208, one or more firmware components, etc.) of one or more of the specialized workstation devices (e.g., the workstation device 112 including the GPU(s) 208, a workstation device including one or more firmware components, etc.). Additionally or alternatively, any of the tasks 120 may be performed utilizing one or more of the portions (e.g., one or more slots of a GPU, one or more firmware components, etc.) of each of the specialized component(s) (e.g., the GPU(s), the firmware component(s), etc.). Any of the task(s) 120 may be a specialized task (e.g., a task associated with a requirement of specialized component (e.g., a GPU, a firmware component, etc.)). Any of the task(s) 120 may be performed on the portion(s) of any of the specialized component(s) of any of the specialized workstation device(s) that satisfy the requirement of the task 120.

Furthermore, by utilizing a queue (e.g., the scheduling queue 108) to schedule each of the tasks 120 as discussed herein, deficiencies of the conventional technology limited to utilizing one component (e.g., GPU, firmware component, etc.) on one workstation device for performing one job (e.g., a single job associated with a specialized task) at a time may be overcome. Specialized tasks may be performed in parallel. Any of the specialized tasks may be performed by scheduling the task the be performed utilizing any of the portion(s) of any of the component(s) of any of the workstation device(s), which is more efficient than conventional technology limited to each task being sequentially performed utilizing the same component (e.g., a first GPU) of the same workstation device.

Furthermore, by utilizing the requirements for scheduling as discussed herein, any of the task(s) 120 may be performed by utilizing one or more of the same components (e.g., one or more of the same GPUs, one or more of the same firmware components, etc.) of one or more of the same specialized workstation device(s) as any other task 120 with a same requirement (e.g., a requirement for a GPU, a requirement for a firmware component, etc.). Any of the tasks 120 associated with the requirement for the GPU may be performed by the same GPU 208, or a different GPU 208, of a same workstation device 112. Any of the tasks 120 associated with the requirement for the GPU may be performed by a different GPU 208 of a different workstation device 112. A portion (e.g., a partial or complete portion) of a period of time during which any of the tasks are performed may be the same or different as a portion (e.g., a partial or complete portion) of period of time during which any of the other tasks are performed. Tasks associated with the requirement for the firmware component may be performed in a similar way as for tasks associated with the requirement for the GPU.

FIG. 3 depicts a block diagram of an environment 300 for resource management for software tests associated with graphics processing units (GPUs), in accordance with examples of the disclosure. The environment 300 includes a task manager system 302. The task manager system 302 may be utilized to implement the processes discussed above in FIGS. 1 and 2.

The task manager system may include a domain name server (DNS) 304. The DNS 304 may receive one or more jobs from workstation devices (e.g., the workstation devices 106 discussed above in FIG. 1). The jobs may be associated with the files 114. Any of the jobs may be associated with any of the files (e.g., the file(s) 114(A)). One or more jobs may be received by the DNS 304, as a partial or complete portion of the task information discussed above in FIG. 1. In some examples, the DNS 304 may determine a job is received, as the task information, and store the task information. In other examples, the job may be received, as the file(s) 114(A). The DNS 304 may determine and/or receive the task information that is associated with (e.g., matches) the file(s) 114(A). The task information may be utilized for scheduling the task associated with the job. In other examples, the job may be received, as a combination of the task information (e.g., some or all of the task information), and the file(s) 114(A).

The task manager system may include a client application 306. The client application 306 may be implemented as an application or a program that operates and/or manages the scheduling queue 108 discussed above in FIG. 1. The client application 306 may receive the job (e.g., the task information and/or the file(s) 114(A)) from the DNS 304 and utilize the task for scheduling. The client application 306 may operate the scheduling queue 108 to schedule the task associated with the job. The client application 306 may store the file(s) 114(A) in a cache 308, discussed below.

The task manager system may include a scheduling application 310. The scheduling application 310 may be a build system utilized to compile one or more files (e.g., the file(s) 114(A). The scheduling application 310 may be a system that is separate from, or integrated with, a build system, and that is utilized along with the build system to compile one or more files (e.g., the file(s) 114(A)). The scheduling application 310 may be implemented as an application or a program that operates and/or manages selection of the GPU workstation device(s) and/or the GPU (s). The scheduling application 310 may monitor the scheduling queue 108 and determine one or more tasks being added to, positioned in, and/or removed from the scheduling queue 108. Selection of one or more workstation devices (e.g., one or more of the workstation devices 110 and 112) may be performed by the scheduling application 310. Selection of one or more GPU devices (e.g., one or more of the GPU devices 208) may be performed by the scheduling application 310. Selection of one or more slots (e.g., one or more of the slots 218) in a GPU device may be performed by the scheduling application 310. In some examples, the GPU workstation device 112, the GPU device 208(i), and/or the slot 220 may be selected by the scheduling application 310. Selection of the GPU workstation device 112, the GPU device 208(i), and/or the slot 220 may be performed for the task 120(A). In some examples, selection of the GPU workstation device 112, the GPU device 208(i), and/or the slot 220 may be performed by the scheduling application 310. In some examples, one or more GPUs may be determined/scheduled instead of the single GPU 208(i). In some examples, one or more slots may be determined/scheduled in each of one or more GPUs 208, instead of the single slot 220.

In some examples, the scheduling application 310 may determine (e.g., generate) a query associated with each of the tasks (e.g., the tasks 120). The scheduling application 310 may store information associated with a number of workstation devices associated with components. The scheduling application 310 may store a number of workstation devices of a first type that include one or more CPUs and one or more GPUs, but that do not include other specialized components (e.g., firmware components). The scheduling application 310 may store a number of workstation devices of a second type that include one or more CPUs, but do not include other specialized components (e.g., GPUs or firmware components). The scheduling application 310 may store a number of workstation devices of a third type that include one or more CPUs and one or more other specialized components (e.g., firmware components), but that do not include one or more GPUs. In some examples, any of the workstation devices of any type (e.g., the first type, the second type, the third type, etc.) may be alternatively designated as any other type based on the workstation device including the components of the other type and any additional components (e.g., any workstation device of the second type or the third type may be designated as the workstation device of the first type; any workstation device of the second type that also include firmware component(s) may be designated as the workstation device of the third type: any workstation device of the third type that also include GPU(s) may be designated as the workstation device of the first type). Designating the workstation devices may include allocating or reallocating the workstation devices at any time during scheduling of the tasks.

The scheduling application 310 may store a DNS name (e.g., a DNS entry) associated with each of the workstation devices. Each of DNS names may be associated with a type of the workstation device. The scheduling application 310 may determine the workstation device utilized to perform the task 120 based on the DNS name being associated with the requirement of the workstation device.

Generating the query may include performing, by the scheduling application 310, a reverse-look-up of the DNS name to determine an IP address mapped to the DNS name. Each of the DNS names may be associated with one or more IP addresses associated with each workstation device. One of the DNS names associated with GPU workstation devices may be associated with one or more IP addresses, each of which may be associated with a GPU workstation device. Various numbers of GPU workstation devices (e.g., 5 GPU workstation devices) may be associated with a DNS name of a first type. One of the DNS names associated with CPU workstation devices may be associated with one or more IP addresses, each of which may be associated with a CPU workstation device. Various numbers of CPU workstation devices (e.g., 20 CPU workstation devices) may be associated with a DNS name of a second type. One of the DNS names associated with firmware workstation devices may be associated with one or more IP addresses, each of which may be associated with a firmware workstation device. Various numbers of firmware workstation devices (e.g., 2 firmware workstation devices) may be associated with a DNS name of a third type.

Performing the query associated with any of the tasks 120 may include determining one of the IP addresses. An IP address may be determined for any of the tasks 120. The IP address may be utilized to determine the workstation device utilized to perform the task 120. Performing the query may include determined any of the tasks 120 associated with a requirement for a GPU to be performed based on an IP address associated with a GPU workstation device. Performing the query may include determined any of the tasks 120 associated with a requirement for a CPU to be performed based on an IP address associated with a CPU workstation device. Performing the query may include determined any of the tasks 120 associated with a requirement for a firmware component to be performed based on an IP address associated with a firmware workstation device.

Any of the tasks 120 associated with each of the requirements may be performed by utilizing load balancing. Any of the tasks 120 associated with each of the requirements may be performed in a round-robin fashion. In some examples, one of the tasks 120 (e.g., a task 120(1)) associated with the GPU requirement may be assigned to one of one or more GPU workstation devices (e.g., a workstation device 112(I). A next one of the tasks 120 (e.g., a task 120(2) associated with the GPU requirement may be assigned to a next one of the GPU workstation device(s) (e.g., a GPU workstation device 112(II). Assigning of the tasks 120 may occur in a similar way until a sixth task 120 (e.g., a task 120(6)), which will be assigned to the GPU workstation device 112(II), in the case in which 5 GPU workstation devices are being utilized for performing the tasks 120. Each of the tasks 120 may be associated with jobs of the same size, or a different size, as any other of the tasks 120.

Any of the workstation devices of any type may include a queue (e.g., a workstation device queue). Each of the tasks 120 may be assigned to any of the workstation devices capable of satisfying any requirement of the task 120 based on the workstation device queue. By way of example, any task 120 with a GPU requirement may be assigned to a GPU workstation device. The task 120 may be assigned by determining a corresponding task (e.g., workstation device task), which may be entered into the workstation device queue of the GPU workstation device. The task 120(1) may be entered as a first workstation device task for GPU workstation device 112(I). The task 120(6) may be entered as a second workstation device task for GPU workstation device 112(I). The workstation device tasks entered into the workstation device queue may be different from the tasks 120 associated with the queue 108. Any of the workstation device tasks may include the same information, or different information, in the workstation device queue, as for the information in the scheduling queue 108 associated with the corresponding task 120.

The cache 308 may store the jobs (e.g., the task information and/or any of the files 114) associated with the tasks. In some examples, the cache 308 may store the file(s) 114(A) and the task information associated with the file 114(A). The file(s) 114(A) and the task information may be stored until completion of the task 120(A). In some examples, the file(s) 114(A) and the task information may be stored after completion of the task 120(A). In those examples, storage of the file(s) 114(A) and the task information may be determined based on types of the file(s) 114(A), on the task information, or on information determined by, or received from, any of the devices associated with managing the scheduling queue 108.

The task manager system may include a cache manager 312. The cache manager 312 may be utilized to manage the cache 308. Management of the cache 308 by the cache manager 312 may be in combination with, or instead of, management by any of the devices associated with managing the scheduling queue 108. The cache 308 and/or the cache manager 312 may be executed by any of the devices associated with managing the scheduling queue 108, or one or more different devices.

FIG. 4 illustrates a block diagram of an example architecture 400 that implements resource management techniques discussed herein. In some examples, the example architecture 400 may comprise computing device(s) 402. The computing device(s) 402 may comprise one or more nodes of a local computing system and/or a distributed computing system (e.g., a cloud computing architecture). Any of the computing device(s) 402 may be utilized to implemented any of the computing devices 106, the workstation device 110, the workstation device 112, any other computing/workstation devices, any external device, and/or the task manager system 302, discussed in FIGS. 1-3.

The computing device(s) 402 may include network interface(s) 404 that enable communication between one or more other local or remote computing device(s). The network interface(s) 404 may include physical and/or logical interfaces for connecting the computing device(s) 402 to another computing device or a network, such as network(s) 408. For example, the network interface(s) 404 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

The computing device(s) 402 may include one or more processors 410) and memory 416 communicatively coupled with the one or more processors 410. The processor(s) 410 may be any suitable processor capable of executing instructions to process data and perform operations as described herein. By way of example and not limitation, the processor(s) 410 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

In some examples, the computing device(s) 402 may be implemented as one or more CPU workstation devices (e.g., the workstation device 110), without including any GPUs. Additionally or alternatively, the computing device(s) 402 may be implemented as one or more GPU workstation devices (e.g., the workstation device 112), with one or more GPUs (e.g., the GPUs 208).

Memory 416 may include non-transitory computer-readable media. The memory 416 may store an operating system and one or more software applications, instructions, programs, and/or data to implement the methods described herein and the functions attributed to the various systems. In various implementations, the memory 416 may include memory implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 416 may store component(s) 412 such as, for example, component(s) of a primary perception system, a secondary perception system, a prediction system, a localization system, a mapping system, a planning system, a ride management system, a training data mining system, a machine-learned model training system, a log generating system, etc. These (and other) system(s) may comprise a variety of components that make up a job/data processing pipeline. Although component(s) 412 are illustrated as being stored in memory 416, component(s) 412 may include processor-executable instructions, machine-learned model(s) (e.g., a neural network), and/or hardware. In some examples, the component(s) 412 may entirely or, in part, comprise hardware such as, for example, a DAC, sensor driver, amplifier, etc.

Memory 416 may additionally or alternatively store a scheduler 414, a build graph 418, and/or an execution management component 420. In some examples, the scheduler 414, the build graph 418, and/or the execution management component 420, may be implemented by the task manager system 302 (e.g., the client application 306 and the scheduling application 310) discussed above in FIG. 3. Memory 416 may additionally or alternatively comprise a data store 422. In some examples, the data store 422 may be separate from memory 416 (e.g., accessible via network(s) 408). In some examples, the scheduler 414 may be a scheduler associated with a processor, operating system, hypervisor, and/or the like. The scheduler 414 and/or hardware associated therewith may maintain a scheduling queue (e.g., the scheduling queue 108 discussed above in FIG. 1). The execution management component 420 may coordinate with the scheduler 414 to add component(s) (e.g., tasks 120) of a job to the scheduling queue 108. In some examples, the execution management component 420 may cause the scheduler 414 to start running a job and may update execution status(es) stored in the build graph 418 and/or store output(s) in the data store 422 responsive to component(s) executing (e.g., running of the jobs associated with performance of the tasks 120). The execution status(es) may be associated with performing and/or completion of the tasks 120. In some examples, updating the execution status(es) may be based at least in part on exit code(s) received from the scheduler 414. The exit code(s) may be determined, generated, and/or utilized by the scheduling queue 108 in any of the modes. The exit code(s) may be associated with performing of a task ceasing temporarily or permanently. In some examples, the exit code(s) may be utilized for the reorganization of the tasks 120 by the scheduling queue 108 in the reorganization mode.

In some examples, when the execution management component 420 detects that a component failed to execute successfully (e.g., performance of the task 120 ceasing or completing), the execution management component 420 may allow the scheduler 414 to run the job according to a configuration of the scheduler 414. The execution management component 420 may provide the specific components to be run and/or an order thereof to the scheduler 414. In some examples, the execution management component 420 may transmit to the scheduler 414 the task information in addition to instructions to perform the task 120 associated with the task information. The scheduler 414 may re-run the job or run remaining portions of the job associated with the task 120.

In some instances, the example architecture 400 may include a vehicle 424. In some instances, the vehicle 424 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 424 may be a fully or partially autonomous vehicle having any other level or classification. Moreover, in some instances, the techniques described herein may be usable by non-autonomous vehicles as well.

In some examples, the vehicle 424 may include the computing device(s) 402. The computing device(s) 402 may include network interface(s) 404 that enable communication between a vehicle 424 and one or more other local or remote computing device(s). For instance, the network interface(s) 404 may facilitate communication with other local computing device(s) on the vehicle 424 and/or a drive system 406, in examples where the vehicle 424 comprises the computing device(s) 402. Also, the network interface (s) 404 may additionally or alternatively allow the computing device(s) 402 to communicate with other nearby computing device(s) (e.g., other nearby vehicles, traffic signals, etc.). The network interface(s) 404 may additionally or alternatively enable the vehicle 424 to communicate with computing device(s) 402.

In some instances, the vehicle 424 may send vehicle data 426, via the network(s) 408, to the computing device(s) 402 at a particular frequency, after a lapse of a predetermined period of time, in near real-time, etc.

In some examples, vehicle data 426 may comprise sensor data received from sensor(s) of the vehicle 424 such as, for example, light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) may include multiple instances of each of these or other types of sensors.

In some examples where the vehicle 424 includes the computing device(s) 402, the computing device(s) 402 may include the drive system 406. In some instances, the drive system 406 may include one or more sensors to detect conditions of the drive system 406 and/or the surroundings of the vehicle 424. By way of example and not limitation, the sensor(s) of the drive system 406 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system 406. In some cases, the sensor(s) on the drive system 406 may overlap or supplement corresponding systems of the vehicle 424 (e.g., sensor(s) discussed above).

The drive system 406 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system 406 may include a drive module controller which may receive and preprocess data from the sensor(s) and to control operation of the various vehicle systems. In some instances, the drive module controller may include one or more processors and memory communicatively coupled with the processor(s) 410. The memory 416 may store instructions to perform various functionalities of the drive system 406. Furthermore, the drive system 406 may also include one or more communication connection(s) that enable communication by the respective drive module with one or more other local or remote computing device(s).

In some examples, the jobs associated with the tasks 120 may be utilized to build and test the software (e.g., the files 114) associated with the task 120. The software may be utilized by the computing device(s) 402 of the vehicle 424 to control the vehicle 424.

Figure 5:
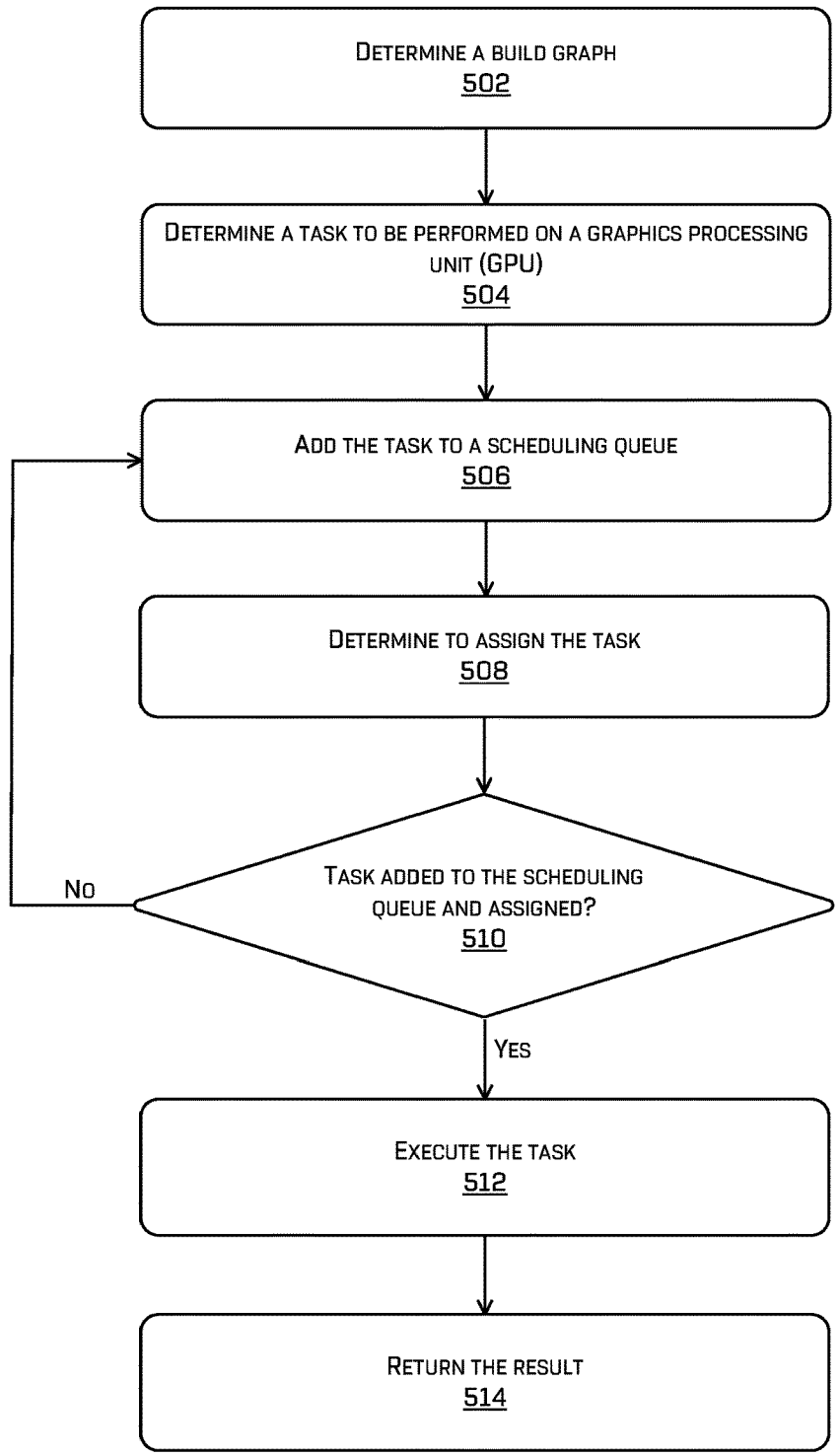
FIG. 5 depicts an example process for resource management for software tests associated with GPU workstation devices.

FIG. 5 depicts an example process for resource management for software tests associated with GPU workstation devices. The resource management techniques discussed herein reduce overall computation time.

At operation 502, the process may include determining a build graph. The build graph may be associated with compiling software code. The build graph may be determined based on the tasks 120 in the scheduling queue 108. Jobs associated with the jobs may be run. The jobs may include compiling software code (e.g., the software code in the files 114). The jobs may be run based on an order of the tasks 120 in the scheduling queue 108.

At operation 504, the process may include determining a task (e.g., the task 120(A)) to be performed on a graphics processing unit (GPU) 208(i). The GPU 208(i) may be included in a parallel computing cluster of a plurality of parallel computing clusters (e.g., GPU clusters). Each of the parallel computing clusters may be associated with a workstation device (e.g., a GPU workstation device). In some examples, each of the parallel computing clusters may be a cluster of GPUs 208 (e.g., the GPUs 208(i)-208(iii)) in a workstation device (e.g., the workstation device 112).

At operation 506, the process may include adding the task 120(A) to a scheduling queue (e.g., the scheduling queue 108). The scheduling queue 108 may be associated with the parallel computing cluster.

At operation 508, the process may include determining to assign the task 120(A), based on a memory constraint associated with the task 120(A), to the parallel computing cluster (e.g., the GPU cluster). The task 120(A) may be assigned based on a position of the task 120(A) in the scheduling queue 108. The task 120(A) may be before positions of any of the other tasks 120 in the scheduling queue 108. In some examples, the task 120(A) may be assigned to the parallel computing cluster based on the position of the task 120(A) being before positions of the other tasks 120. Assigning the task 120(A) based on the position of the task 120(A) being before positions of the other tasks 120 may allow the task 120(A) to be performed without delay. The task 120(A) may be performed without delay once the position of the task 120(A) is first in the scheduling queue 108, due to the task 120(A) having already been assigned.

At operation 510, the process may proceed to the operation 506, based on determining that the task 120(A) is not added to the scheduling queue 108 and assigned. The process can proceed to the operation 512, based on determining that the task 120(A) is added to the scheduling queue 108 and assigned.

At operation 512, the process may include executing (e.g., performing) the task 120(A). The task may be executed on the GPU cluster to determine a result. The task may be executed on the GPU 208(*i*) of the GPU cluster. The task may be executed on the slot 220 of the GPU 208(*i*).

At operation 514, the process may include returning the result. The result may be returned to a computing device (e.g., the computing device 106 associated with the file(s) (e.g., the file(s) 114(A) utilized to determine the task (e.g., the task 120(A)), another one of the computing devices (e.g., any of the computing devices 106), any other local device, an external device, etc.

EXAMPLE CLAUSES

A: A system comprising: one or more processors: and one or more computer-readable media storing instructions executable by the one or more processors, wherein the instructions, when executed, cause the system to perform operations comprising: determining a build graph associated with compiling software code: determining, based at least in part on the build graph, a task to be performed on a graphics processing unit (GPU) cluster of a plurality of GPU clusters: adding the task to a scheduling queue associated with the plurality of GPU clusters: determining, based at least in part on a memory constraint associated with the task, to assign the task to an individual GPU of the GPU cluster: executing the task on the individual GPU of the GPU cluster to determine a result: and returning the result to a client device.

B: The system of paragraph A, wherein the operations further comprise: determining, based at least in part on the build graph, a second task to be performed on a central processing unit (CPU) cluster: and sending the second task to the CPU cluster.

C: The system of paragraph A or B, wherein the memory constraint comprises a size of a memory or a period of time associated with executing the task.

D: The system of any of paragraphs A-C, wherein the operations further comprise: scheduling the task, as a first task, based at least in part on a characteristic associated with a queue, the characteristic comprising at least one of prioritization, preemption, or reorganization, wherein: the prioritization comprises increasing a priority associated with the first task based at least in part on an amount of time the first task spent in the queue being greater than a threshold amount of time: the preemption comprises increasing a priority of the first task based at least in part on a number of preemptions associated with the first task being greater than a threshold number: and the reorganization comprises a second task being transferred from the individual GPU, as a first GPU, to a second GPU, based at least in part on an amount of memory associated with the second task not exceeding a total amount of available memory of the second GPU.

E: The system of any of paragraphs A-D, wherein the operations further comprise: assigning the task to the individual GPU of the GPU cluster based at least in part on load balancing.

F: A method comprising: determining a build graph associated with software code; determining, based at least in part on the build graph, a task to be performed on a parallel computing cluster: adding the task to a scheduling queue associated with the parallel computing cluster: determining, based at least in part on a memory constraint associated with the task, to assign the task to the parallel computing cluster: executing the task on the parallel computing cluster to determine a result: and returning the result to a computing device.

G: The method of paragraph F, wherein: determining to assign the task further comprises determining to assign the task to an individual parallel processing unit of the parallel computing cluster: and executing the task further comprises executing the task on the individual parallel processing unit.

H: The method of paragraph F or G, further comprising: determining, based at least in part on the build graph, a second task to be performed on a serial processing unit) cluster; and sending the second task to the serial processing unit cluster.

I: The method of any of paragraphs F-H, wherein: the memory constraint comprises a size of a memory or a period of time required for executing the task: and the task is assigned based at least in part on a mode of the scheduling queue, the mode comprising at least one of: a first mode associated with the scheduling queue assigning tasks based at least in part on a first-in, first-out (FIFO) order, a second mode associated with the scheduling queue assigning tasks based at least in part on a prioritization, or a third mode associated with the scheduling queue assigning tasks based at least in part on preemption.

J: The method of any of paragraphs F-I, further comprising scheduling the task, as a first task, based at least in part on a characteristic associated with a queue, the characteristic comprising at least one of prioritization, preemption, or reorganization, wherein: the prioritization comprises increasing a priority associated with the first task based at least in part on an amount of time the first task spent in the queue being greater than a threshold amount of time: the preemption comprises increasing a priority of the first task based at least in part on a number of preemptions associated with the first task being greater than a threshold number; and the reorganization comprises a second task being transferred from an individual parallel processing unit, as a first parallel processing unit, to a second parallel processing unit, based at least in part on an amount of memory associated with the second task not exceeding a total amount of available memory of the second parallel processing unit.

K: The method of any of paragraphs F-J, further comprising: assigning the task, as a first task, to a first parallel processing unit based at least in part on load balancing, the first parallel processing unit being selected based at least in part on a first job load being executed by the first parallel processing unit and a second job load being executed by a second parallel processing unit, the first job load being greater than the second job load: or assigning a second task to a third parallel processing unit based at least in part on a first total size of available memory in the third parallel processing unit and a second total size of available memory in a fourth parallel processing unit, the first total size of available memory in the third parallel processing unit being greater than a second total size of available memory in the fourth parallel processing unit.

L: The method of any of paragraphs F-K, wherein: the scheduling queue receives both serial processing unit tasks and parallel processing unit tasks: serial processing unit workstation devices publish availability associated with the serial processing unit workstation devices to a scheduling algorithm: parallel processing unit workstation devices publish availability associated with the parallel processing unit workstation devices to the scheduling algorithm: and the scheduling algorithm allocates the serial processing unit tasks to the serial processing unit workstation devices, and the parallel processing unit tasks to the parallel processing unit workstation devices.

M: The method of any of paragraphs F-L, wherein: the task is associated with a first parallel processing unit test or a second parallel processing unit test: the first parallel processing unit test comprises a parallel processing unit computing library, the parallel processing unit computing library being utilized for memory allocation on an individual parallel processing unit of the parallel computing cluster to transmit data to a memory of the individual parallel processing unit: and the second parallel processing unit test utilizing a machine learned (ML) model, the ML model outputting a result of the second parallel processing unit test based on training that requires any parallel processing unit of the parallel computing cluster.

N: The method of any of paragraphs F-M, wherein the task is a first task, further comprising: determining, based at least in part on a parallel processing unit identifier associated with a parallel processing unit, the parallel processing unit in a parallel processing unit workstation device comprising the parallel computing cluster for executing a first software test associated with the first task: and determining a serial processing unit in a serial processing unit workstation device for executing a second software test associated with a second task added to the scheduling queue.

O: The method of any of paragraphs F-N, wherein: the task is associated with a first parallel processing unit test or a second parallel processing unit test: the first parallel processing unit test is executable by a first parallel processing unit of the parallel computing cluster based at least in part on a number of tests being executed by the first parallel processing unit not meeting or exceeding a threshold number of tests: and the second parallel processing unit test is executable by a second parallel processing unit of the parallel computing cluster, based at least in part on a memory size required for executing the second parallel processing unit test not exceeding a total size of available memory of the second parallel processing unit for executing parallel processing unit tests.

P: One or more non-transitory computer-readable media storing instructions that, when executed, cause one or more processors to perform operations comprising: determining, based at least in part on a build graph associated with software code, a task to be performed on a parallel processing unit cluster of a plurality of parallel processing unit clusters: adding the task to a scheduling queue associated with the plurality of parallel processing unit clusters; determining, based at least in part on a memory constraint associated with the task, to assign the task to the parallel processing unit cluster: executing the task on the parallel processing unit cluster to determine a result: and returning the result to a computing device.

Q: The one or more non-transitory computer-readable media of paragraph P, wherein: determining to assign the task further comprises determining to assign the task to an individual parallel processing unit of the parallel processing unit cluster: and executing the task further comprises executing the task on the individual parallel processing unit, based at least on a test flag associated with the task, the test flag being a partial parallel processing unit test flag or a full parallel processing unit test flag.

R: The one or more non-transitory computer-readable media of paragraph P or Q, wherein the operations further comprise: determining, based at least in part on the build graph, a second task to be performed on a serial processing unit cluster: and sending the second task to the serial processing unit cluster.

S: The one or more non-transitory computer-readable media of any of paragraphs P-R, wherein: the memory constraint comprises a size of a memory or a period of time associated with executing the task: and the task is assigned based at least in part on a mode of the scheduling queue, the mode comprising at least one of: a first mode associated with the scheduling queue assigning tasks based at least in part on a first-in, first-out (FIFO) order, a second mode associated with the scheduling queue assigning tasks based at least in part on a prioritization, or a third mode associated with the scheduling queue assigning tasks based at least in part on preemption.

T: The one or more non-transitory computer-readable media of any of paragraphs P-S, wherein the operations further comprise: scheduling the task, as a first task, based at least in part on a characteristic associated with a queue, the characteristic comprising at least one of prioritization, preemption, or reorganization, wherein: the prioritization comprises increasing a priority associated with the first task based at least in part on an amount of time the first task spent in the queue being greater than a threshold amount of time: the preemption comprises increasing a priority of the first task based at least in part on a number of preemptions associated with the first task being greater than a threshold number: and the reorganization comprises a second task being transferred from an individual parallel processing unit, as a first parallel processing unit, to a second parallel processing unit, based at least in part on an amount of memory associated with the second task not exceeding a total amount of available memory of the second parallel processing unit.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
      determining a build graph associated with compiling software code;
      determining, based at least in part on the build graph, a task to be performed on a graphics processing unit (GPU) cluster of a plurality of GPU clusters;
      adding the task to a scheduling queue associated with the plurality of GPU clusters;
      determining, based at least in part on a memory constraint associated with the task, to assign the task to an individual GPU of the GPU cluster;
      assigning the task to the individual GPU of the GPU cluster based at least in part on load balancing;
      executing the task on the individual GPU of the GPU cluster to determine a result; and
      returning the result to a client device.

2. The system of claim 1, wherein the operations further comprise:
   determining, based at least in part on the build graph, a second task to be performed on a central processing unit (CPU) cluster; and
   sending the second task to the CPU cluster.

3. The system of claim 1, wherein the memory constraint comprises a size of a memory or a period of time associated with executing the task.

4. The system of claim 1, wherein the operations further comprise:
   scheduling the task, as a first task, based at least in part on a characteristic associated with a queue, the characteristic comprising at least one of prioritization, preemption, or reorganization, wherein:
      the prioritization comprises increasing a priority associated with the first task based at least in part on an amount of time the first task spent in the queue being greater than a threshold amount of time;
      the preemption comprises increasing the priority of the first task based at least in part on a number of preemptions associated with the first task being greater than a threshold number; and
      the reorganization comprises a second task being transferred from the individual GPU, as a first GPU, to a second GPU, based at least in part on an amount of memory associated with the second task not exceeding a total amount of available memory of the second GPU.

5. A method comprising:
   determining a build graph associated with software code;
   determining, based at least in part on the build graph, a task to be performed on a graphics processing unit (GPU) cluster of a plurality of GPU clusters;
   adding the task to a scheduling queue associated with the plurality of GPU clusters;
   determining to assign the task to an individual GPU of the GPU cluster, based at least in part on a memory constraint associated with the task;
   assigning the task to the individual GPU of the GPU cluster based at least in part on load balancing;
   executing the task on the individual GPU of the GPU cluster to determine a result; and
   returning the result to a computing device.

6. The method of claim 5, wherein:
   assigning the task further comprises determining to assign the task to an individual parallel processing unit of a multi-processing unit parallel computing cluster, the individual parallel processing unit including the individual GPU, the multi-processing unit parallel computing cluster including the GPU cluster.

7. The method of claim 5, further comprising:
   determining, based at least in part on the build graph, a second task to be performed on a serial processing unit cluster; and
   sending the second task to the serial processing unit cluster.

8. The method of claim 5, wherein the task is assigned based at least in part on a mode of the scheduling queue, the mode comprising at least one of:
   a first mode associated with the scheduling queue assigning tasks based at least in part on a first-in, first-out (FIFO) order,
   a second mode associated with the scheduling queue assigning tasks based at least in part on a prioritization, or
   a third mode associated with the scheduling queue assigning tasks based at least in part on preemption.

9. The method of claim 5, further comprising
   scheduling the task, as a first task, based at least in part on a characteristic associated with a queue, the characteristic comprising at least one of prioritization, preemption, or reorganization, wherein:
      the prioritization comprises increasing a priority associated with the first task based at least in part on an amount of time the first task spent in the queue being greater than a threshold amount of time;
      the preemption comprises increasing the priority of the first task based at least in part on a number of preemptions associated with the first task being greater than a threshold number; and
      the reorganization comprises a second task being transferred from an individual parallel processing unit, as a first parallel processing unit, to a second parallel processing unit, based at least in part on an amount of memory associated with the second task not exceeding a total amount of available memory of the second parallel processing unit.

10. The method of claim 5, further comprising:
determining to assign the task, as a first task, to a first parallel processing unit based at least in part on the load balancing, the first parallel processing unit being selected based at least in part on a first job load being executed by the first parallel processing unit and a second job load being executed by a second parallel processing unit, the first job load being greater than the second job load, the first parallel processing unit including the individual GPU; or
determining to assign a second task to a third parallel processing unit based at least in part on a first total size of available memory in the third parallel processing unit and a second total size of available memory in a fourth parallel processing unit, the first total size of available memory in the third parallel processing unit being greater than a second total size of available memory in the fourth parallel processing unit.

11. The method of claim 5, wherein:
the scheduling queue receives both serial processing unit tasks and parallel processing unit tasks;
serial processing unit workstation devices publish availability associated with the serial processing unit workstation devices to a scheduling algorithm;
parallel processing unit workstation devices publish availability associated with the parallel processing unit workstation devices to the scheduling algorithm; and
the scheduling algorithm allocates the serial processing unit tasks to the serial processing unit workstation devices, and the parallel processing unit tasks to the parallel processing unit workstation devices.

12. The method of claim 5, wherein:
the task is associated with a first parallel processing unit test or a second parallel processing unit test;
the first parallel processing unit test comprises a parallel processing unit computing library, the parallel processing unit computing library being utilized for memory allocation on an individual parallel processing unit of a multi-processing unit parallel computing cluster to transmit data to a memory of the individual parallel processing unit; and
the second parallel processing unit test utilizing a machine learned (ML) model, the ML model outputting a result of the second parallel processing unit test based on training that requires any parallel processing unit of the multi-processing unit parallel computing cluster.

13. The method of claim 5, wherein the task is a first task, further comprising:
determining, based at least in part on a parallel processing unit identifier associated with a parallel processing unit, the parallel processing unit in a parallel processing unit workstation device comprising a multi-processing unit parallel computing cluster for executing a first software test associated with the first task; and
determining a serial processing unit in a serial processing unit workstation device for executing a second software test associated with a second task added to the scheduling queue.

14. The method of claim 5, wherein:
the task is associated with a first parallel processing unit test or a second parallel processing unit test;
the first parallel processing unit test is executable by a first parallel processing unit of a multi-processing unit parallel computing cluster based at least in part on a number of tests being executed by the first parallel processing unit not meeting or exceeding a threshold number of tests; and
the second parallel processing unit test is executable by a second parallel processing unit of the multi-processing unit parallel computing cluster, based at least in part on a memory size required for executing the second parallel processing unit test not exceeding a total size of available memory of the second parallel processing unit for executing parallel processing unit tests.

15. The method of claim 5, wherein the memory constraint comprises a size of a memory or a period of time required for executing the task.

16. One or more non-transitory computer-readable media storing instructions that, when executed, cause one or more processors to perform operations comprising:
determining, based at least in part on a build graph associated with software code, a task to be performed on a graphics processing unit (GPU) cluster of a plurality of GPU clusters;
adding the task to a scheduling queue associated with the plurality of GPU clusters;
determining to assign, based at least in part on a memory constraint associated with the task, the task to an individual GPU of the GPU cluster;
assigning the task to the individual GPU of the GPU cluster based at least in part on load balancing;
executing the task on the individual GPU of the GPU cluster to determine a result; and
returning the result to a computing device.

17. The one or more non-transitory computer-readable media of claim 16, wherein:
assigning the task further comprises determining to assign the task to an individual parallel processing unit of a parallel processing unit cluster, the individual parallel processing unit including the individual GPU, the parallel processing unit cluster including the GPU cluster.

18. The one or more non-transitory computer-readable media of claim 16, wherein the operations further comprise:
determining, based at least in part on the build graph, a second task to be performed on a serial processing unit cluster; and
sending the second task to the serial processing unit cluster.

19. The one or more non-transitory computer-readable media of claim 16, wherein the task is assigned based at least in part on a mode of the scheduling queue, the mode comprising at least one of:
a first mode associated with the scheduling queue assigning tasks based at least in part on a first-in, first-out (FIFO) order,
a second mode associated with the scheduling queue assigning tasks based at least in part on a prioritization, or
a third mode associated with the scheduling queue assigning tasks based at least in part on preemption.

20. The one or more non-transitory computer-readable media of claim 16, wherein the operations further comprise:
scheduling the task, as a first task, based at least in part on a characteristic associated with a queue, the characteristic comprising at least one of prioritization, preemption, or reorganization, wherein:
the prioritization comprises increasing a priority associated with the first task based at least in part on an amount of time the first task spent in the queue being greater than a threshold amount of time;
the preemption comprises increasing the priority of the first task based at least in part on a number of preemptions associated with the first task being greater than a threshold number; and the reorganization comprises a second task being transferred from an individual parallel processing unit, as a first parallel processing unit, to a second parallel processing unit, based at least in part on an amount of memory associated with the second task not exceeding a total amount of available memory of the second parallel processing unit.

\* \* \* \* \*